US012137502B2

(12) United States Patent
Kung et al.

(10) Patent No.: US 12,137,502 B2
(45) Date of Patent: Nov. 5, 2024

(54) LINEAR DRIVING MODULE

(71) Applicant: INDUSTRIAL TECHNOLOGY RESEARCH INSTITUTE, Hsinchu (TW)

(72) Inventors: Che-Min Kung, Zhubei (TW); Ching-Ran Lee, Jinning Township, Kinmen County (TW); Shi-Wei Huang, Taichung (TW); Wen-Tien Tsai, Liuqiu Township, Pingtung County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 180 days.

(21) Appl. No.: 18/078,347

(22) Filed: Dec. 9, 2022

(65) Prior Publication Data

US 2024/0179812 A1 May 30, 2024

(30) Foreign Application Priority Data

Nov. 30, 2022 (TW) ................................. 111146019

(51) Int. Cl.
*H05B 45/14* (2020.01)
*H05B 45/3725* (2020.01)
*H05B 45/48* (2020.01)

(52) U.S. Cl.
CPC ............. *H05B 45/14* (2020.01); *H05B 45/48* (2020.01); *H05B 45/3725* (2020.01)

(58) Field of Classification Search
CPC .... H05B 45/14; H05B 45/48; H05B 45/3725; H05B 45/10; H05B 45/395
See application file for complete search history.

(56) References Cited

U.S. PATENT DOCUMENTS 5,691,605 A * 11/1997 Xia .................... H05B 41/2985 315/293
8,917,076 B2 12/2014 Hsing et al.
(Continued)

FOREIGN PATENT DOCUMENTS

CN 202059626 U 11/2011
CN 106941753 A 7/2017
(Continued)

OTHER PUBLICATIONS

Richtek, "RT7320 / RT7321 / RT7322 Offline Linear LED Drivers," Datasheet, obtained on Mar. 15, 2023, 1 page total.

*Primary Examiner* — Abdullah A Riyami
*Assistant Examiner* — Syed M Kaiser
(74) *Attorney, Agent, or Firm* — Birch, Stewart, Kolasch & Birch, LLP

(57) ABSTRACT

A linear driving module includes: a control circuit, a dimming module, and a low-dropout regulator. The control circuit generates switch signals in response to a change in a pulsed DC voltage. The dimming module receives the pulsed DC voltage. The dimming module includes dimming units. Light-emitting diode units in the dimming units are in a light-on state or a light-off state. The low-dropout regulator receives an input voltage from the dimming unit, and converts the input voltage into a regulated voltage. The input voltage varies with the number of light-emitting diode units in the light-on state. The input voltage is lower than the pulsed DC voltage, and the regulated voltage is lower than the input voltage.

20 Claims, 12 Drawing Sheets

(56) References Cited

U.S. PATENT DOCUMENTS

| | | | | |
|---|---|---|---|---|
| 9,374,855 | B2 | 6/2016 | Siessegger | |
| 9,408,258 | B2 | 8/2016 | Siessegger | |
| 9,661,696 | B1 | 5/2017 | Chen et al. | |
| 10,031,166 | B2 * | 7/2018 | Kadonoff | G01R 19/00 |
| 10,164,538 | B1 | 12/2018 | Tang et al. | |
| 10,244,609 | B2 | 3/2019 | Siessegger | |
| 10,727,758 | B2 | 7/2020 | Ramadass et al. | |
| 2014/0028202 | A1 * | 1/2014 | Zhao | H05B 45/10 315/307 |
| 2018/0324916 | A1 * | 11/2018 | Lai | H05B 45/3725 |
| 2020/0112171 | A1 * | 4/2020 | Bogart | H02J 3/14 |
| 2022/0367157 | A1 * | 11/2022 | Cui | H01J 37/32715 |
| 2022/0367158 | A1 * | 11/2022 | Cui | H01J 37/32715 |

FOREIGN PATENT DOCUMENTS

| | | | | |
|---|---|---|---|---|
| CN | 107197568 | A | 9/2017 | |
| CN | 207369352 | U | 5/2018 | |
| CN | 109691230 | A * | 4/2019 | H02J 9/061 |
| CN | 209593284 | U * | 11/2019 | H02M 1/08 |
| DE | 102004048232 | A1 * | 4/2006 | H05B 39/02 |
| TW | 201301945 | A1 | 1/2013 | |
| TW | I513361 | B | 12/2015 | |
| TW | M579758 | U | 6/2019 | |
| TW | M586027 | U | 11/2019 | |
| TW | M589406 | U | 1/2020 | |
| TW | M613419 | U | 6/2021 | |
| WO | WO-2015021607 | A1 * | 2/2015 | G09G 3/3406 |

* cited by examiner

LINEAR DRIVING MODULE

This application claims the benefit of Taiwan application Serial No. 111146019, filed Nov. 30, 2022, the subject matter of which is incorporated herein by reference.

FIELD

The disclosure relates in general to a linear driving module, and more particularly to a linear driving module capable of stably providing an input voltage to a low-dropout regulator.

BACKGROUND

Lamps with dimming functions are commonly available. With the development of wireless communication technology (for example, Bluetooth), lamps with wireless communication functions have come onto the market now.

When a linear driving circuit is applied to this type of lamp, in addition to the power supplied to a light-emitting element for illumination, a stable low-voltage and large-current driving power is provided to a control circuit of a power switch of the linear driving circuit, and a communication module (that is, wireless communication) for communication dimming. In the existing technology, a low-dropout regulator (LDO) is disposed directly at an output terminal of a bridge rectifier circuit or on a capacitor of a valley-fill circuit (valley filler). For example, the bridge rectifier circuit rectifies the input of 120V AC voltage, and the output has a peak value of about 170V. The DC pulse, whose voltage drops from a high voltage to 3.3V or 5V, is supplied to the control circuit and the communication module. However, a great voltage drop across the low-dropout regulator results in considerable power consumption, and the overall efficiency of the linear driving circuit reduces.

Therefore, how to design a linear driving circuit with a low voltage drop across the low-dropout regulator to increase efficiency and reduce overall power consumption is an important issue for the person in the field.

SUMMARY

The disclosure is directed to a linear driving module. According to a first aspect of the disclosure, a linear driving module adapted to be used in a lamp is provided. The linear driving module includes: a control circuit, a dimming module, and a low-dropout regulator. The control circuit generates a plurality of switch signals in response to a change in a pulsed DC voltage. The dimming module has a module voltage drop and receives the pulsed DC voltage. The dimming module includes: N dimming units connected in series. Each of the N dimming units includes a light-emitting diode unit. The light-emitting diode units are in a light-on state or a light-off state in response to the switch signals. The module voltage drop varies with the number of the light-emitting diode units in the light-on state in the N dimming units. The low-dropout regulator is electrically connected to the dimming module. The low-dropout regulator receives an input voltage generated by the dimming module according to the pulsed DC voltage and the module voltage drop, and converts the input voltage into a regulated voltage. The input voltage is lower than the pulsed DC voltage, and the regulated voltage is lower than the input voltage. N is a positive integer.

According to a second aspect of the disclosure, a linear driving module adapted to be used in a lamp is provided. The linear driving module includes: a control circuit, a dimming module, a bias circuit, and a low-dropout regulator. The control circuit is adapted to receive a pulsed DC voltage and generate a plurality of switch signals in response to a change in the pulsed DC voltage. The dimming module is electrically connected to the control circuit. The dimming module generates a first source voltage according to the pulsed DC voltage and a module voltage drop. The dimming module includes: N dimming units connected in series. Each of the N dimming units includes: a light-emitting diode unit. The light-emitting diode units are in a light-on state or a light-off state in response to the switch signals. N is a positive integer, and the module voltage drop varies with the number of the light-emitting diode units in the light-on state in the N dimming units. The bias circuit is electrically connected to the control circuit. The bias circuit generates a second source voltage according to the pulsed DC voltage. The low-dropout regulator receives either the first source voltage or the second source voltage as an input voltage in response to the change of the module voltage drop, and converts the input voltage into a regulated voltage. The first source voltage and the second source voltage are lower than or equal to the pulsed DC voltage, and the regulated voltage is lower than the input voltage.

According to a third aspect of the disclosure, a linear driving module is provided. The linear driving module includes: a bias circuit and a low-dropout regulator. The bias circuit generates an input voltage according to a pulsed DC voltage. The bias circuit includes: a first transistor, a second transistor, and a capacitor. The first transistor is switched off when the pulsed DC voltage is lower than a threshold voltage, and is switched on when the pulsed DC voltage is higher than the threshold voltage. The second transistor is electrically connected to the first transistor and a bias terminal. The second transistor is switched on when the first transistor is switched off, and is switched off when the first transistor is switched on. The capacitor is electrically connected to the bias terminal. The capacitor is charged by the pulsed DC voltage when the second transistor is switched on, and is discharged to provide a current to the bias terminal when the first transistor is switched on. The low-dropout regulator is electrically connected to the bias terminal. When the second transistor is switched on, the pulsed DC voltage transmitted to the bias terminal serves as the input voltage, and the input voltage is converted into a regulated voltage. When the first transistor is switched on, a discharged current from the capacitor serves as the input voltage, and the input voltage is converted into the regulated voltage, wherein the regulated voltage is lower than the input voltage.

According to a fourth aspect of the disclosure, a bias circuit is provided. The bias circuit generates an input voltage according to a pulsed DC voltage. The bias circuit includes: a first transistor, a second transistor and a capacitor. The first transistor is switched off when the pulsed DC voltage is lower than a threshold voltage, and is switched on when the pulsed DC voltage is higher than the threshold voltage. The second transistor is electrically connected to the first transistor and a bias terminal. The second transistor is switched on when the first transistor is switched off, and is switched off when the first transistor is switched on. The capacitor is electrically connected to the bias terminal. The capacitor is charged by the pulsed DC voltage when the second transistor is switched on, and is discharged to provide a current to the bias terminal when the first transistor is switched on.

To have a better understanding of the above-mentioned and other aspects of the disclosure, embodiments are given in the following detailed description with accompanying drawings, in which:

DETAILED DESCRIPTION

As described above, much power is wasted in the low-dropout regulator during the voltage transformation in the existing technology. The disclosure provides a dimming module that can lower the input voltage Vin for the low-dropout regulator.

Figure 1:
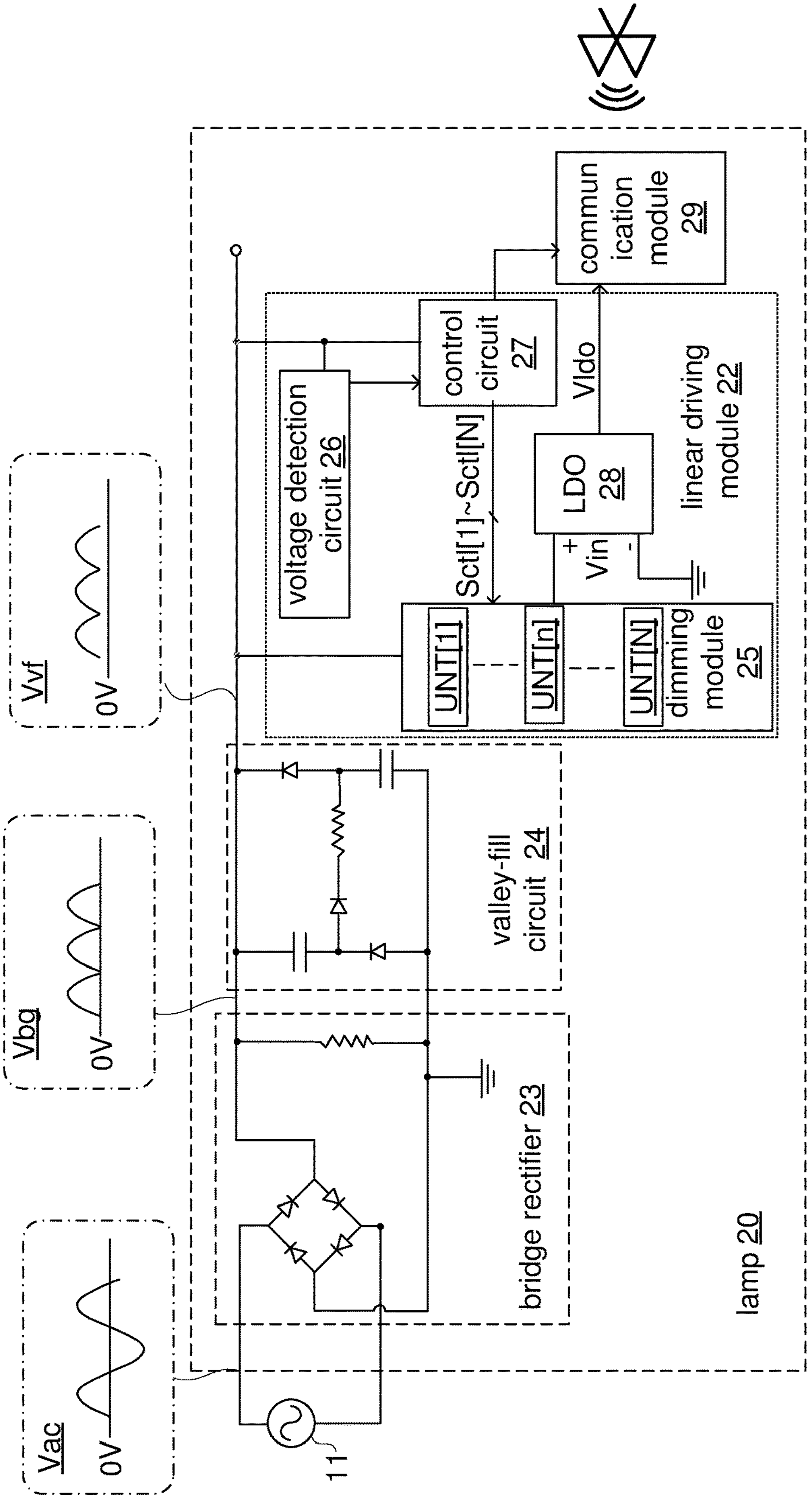
FIG. 1 is a block diagram of a lamp using a dimming module to provide an input voltage to an LDO according to the disclosure.

Please refer to FIG. 1, which is a block diagram of a lamp according to the disclosure. In the embodiment, the lamp 20 includes: a bridge rectifier 23, a valley-fill circuit (valley filler) 24, a linear driving module 22, and a communication module 29. The bridge rectifier 23 is electrically connected to an AC source 11 and the valley-fill circuit 24, and the linear driving module 22 is electrically connected to the valley-fill circuit 24 and the communication module 29.

The bridge rectifier 23 converts the AC voltage Vac output by the AC source 11 into a rectified voltage Vbg. Then, the valley-fill circuit 24 filters the rectified voltage Vbg to generate a valley-fill voltage Vvf. Therefore, the valley-fill voltage Vvf has a smoother wave than the rectified voltage Vbg, and the valley-fill voltage Vvf is always higher than the ground voltage 0V (Vvf>0V). The valley-fill circuit 24 is optional, and is not necessary for the circuit architecture of the lamp 20. On condition that the valley-fill circuit 24 is used, the linear driving module 22 receives the valley-fill voltage Vvf output by the valley-fill circuit 24 and then generates the input voltage Vin accordingly. Hence, the utilization of the valley-fill circuit 24 can maintain the input voltage Vin for the linear driving module 22 higher than 0V (Vin>0V). On condition that there is no valley-fill circuit 24, the linear driving module 22 receives the rectified voltage Vbg output by the bridge rectifier 23, and then generates the input voltage Vin accordingly.

In a concise manner, the embodiments given below calls the voltage transmitted from the bridge rectifier 23 or the valley-fill circuit 24 to the linear driving module 22 as a pulsed DC voltage Vpdc(t). The pulsed DC voltage Vpdc(t) has fixed polarity and time-dependent magnitude.

The linear driving module 22 applied to the lamp 20 includes: a voltage detection circuit 26, a control circuit 27, a dimming module 25, and a low-dropout regulator (LDO) 28. The voltage detection circuit 26, the control circuit 27, and the dimming module 25 are adapted to receive the pulsed DC voltage Vpdc(t).

The voltage detection circuit 26 is adapted to detect the change of the pulsed DC voltage Vpdc(t) to generate and transmit a voltage detection result Sdet to the control circuit 27. The control circuit 27, electrically connected to the dimming module 25, can generate and transmit switch signals Sctl[1]~Sctl[N] to the dimming module 25 according to the voltage detection result Sdet. The control circuit 27 determines whether to generate the switch signals Sctl[1]~Sctl[N] and which switch signals should be generated based on a reference source such as the voltage detection circuit 26, but the disclosure is not limited to this in real applications.

The dimming module 25 has a module voltage drop ΔVsum and receives the pulsed DC voltage Vpdc(t). The LDO 28 is electrically connected to the dimming module 25. The dimming module 25 provides the input voltage Vin (the output of the dimming module 25) to the LDO 28, wherein the input voltage Vin is generated according to the pulsed DC voltage Vpdc(t) and the module voltage drop ΔVsum. After receiving the input voltage Vin and converting the input voltage Vin into a regulated voltage Vldo, the LDO 28 provides the regulated voltage Vldo to the communication module 29 to serve as the basic power of the communication module 29 (for example, wireless communication). The input voltage Vin (for example, 9~27V) is lower than the pulsed DC voltage Vpdc(t), and the regulated voltage Vldo is lower than the input voltage Vin, that is, Vldo<Vin<Vpdc(t).

The dimming module 25 includes N dimming units UNT[1]~UNT[N] connected in series. The light-emitting state of the dimming units UNT[1]~UNT[N] is determined according to the switch signals Sctl[1]~Sctl[N] sent by the control circuit 27. For illustration purposes, the variable n represents the dimming stage in the description, wherein n and N are positive integers and n≤N. In one embodiment, the dimming units UNT[1]~UNT[N] include light-emitting diode units LED[1]~LED[N], and the light-emitting diode units LED[1]~LED[N] are connected in series. The light-emitting diode units LED[1]~LED[N] are in the light-on state, or the light-off state in response to the switch signals Sctl[1]~Sctl[N]. Specifically, when the dimming module 25 operates at the dimming stage STGn, it represents that the light-emitting diode units LED[1]~LED[n] of the dimming units UNT[1]~UNT[n] are in the light-on state, and the light-emitting diode units LED[n+1]~LED[N] of the dimming units UNT[n+1]~UNT[N] are in the light-off state.

Hence, when the pulsed DC voltage Vpdc(t) rises, the number of the light-emitting diode units LED[1]~LED[n] in the light-on state increases. On the other hand, when the pulsed DC voltage Vpdc(t) falls, the number of the lighted light-emitting diode units LED[1]~LED[n] in the light-on state decreases. Regardless of the number of the lighted light-emitting diode units LED[1]~LED[n], the input voltage Vin provided by the dimming module 25 to the LDO 28 maintains at a voltage approximate to the regulated voltage Vldo. According to the concepts of the disclosure, the interior circuit design of the dimming units UNT[1]~UNT[N] is not limited. Various embodiments are provided below to describe the applicable configuration of the dimming unit.

In the description, brackets and numbers are used to indicate the position of the dimming unit UNT[n] (n=1~N). In different embodiments, the dimming unit UNT[n] may include a different number of LEDs, switches, and current sources. Table 1 shows the internal components of the dimming unit, taking the dimming units UNT[1], UNT[n], and UNT[N] as examples.

TABLE 1

| Dimming unit | Light-emitting diode unit | Switch unit | Branch current source (Embodiment 1) | Common current source (Embodiment 2, 3) | Unit voltage drop |
|---|---|---|---|---|---|
| UNT[1] | LED[1] | SW[1] | cS[1] | cS_com | ΔVunt[1] |
| UNT[n] | LED[n] | SW[n] | cS[n] | | ΔVunt[n] |
| UNT[N] | LED[N] | SW[N] | cS[N] | | ΔVunt[N] |

The variable n (n=1~N) is taken as an example to describe the components of the dimming unit UNT[n], wherein n means the nth one of values 1~N. The dimming unit UNT[n] includes: a light-emitting diode unit LED[n] and a switch unit SW[n]. In the first embodiment, the dimming unit UNT[n] further includes a branch current source cS[n]. In the second and the third embodiments, the dimming module has a common current source cS_com shared by the dimming units UNT[1]~UNT[N]. The unit voltage drop ΔVunt[n ]is defined as the voltage difference between two terminals of the dimming unit UNT[n] at the dimming stage STGn.

The light-emitting diode unit LED[n] may include one or more light-emitting diodes. In real applications, the number of the light-emitting diode units LED[n] may be determined according to the unit voltage drop ΔVunt[n] and single LED voltage drop $\Delta V_{LED}$. For example, if the unit voltage drop ΔVunt[n] is 18V and the single LED voltage drop $\Delta V_{LED}$ is 9V, the light-emitting diode unit LED[n] includes two light-emitting diodes connected in series. For example, if the unit voltage drop ΔVunt[n] is 18V and the signal LED voltage drop $\Delta V_{LED}$ is 6V, the light-emitting diode unit LED[n] may include three light-emitting diodes connected in series. For indicative purposes, the symbol ΔV with a subscript is defined as the voltage drop across the corresponding component.

As described above, the switch unit SW[n] is switched on or off according to the switch signal Sctl[n] sent by the control circuit 27. The switch signal Sctl[n] is adapted to control the turned-on/off state of the switch unit SW[n]. In different embodiments, the switch unit SW[n] may include a different number of switches. Furthermore, in real applications, the light-emitting diode units LED[1]~LED[N] may not have the same number of the light-emitting diodes, which is determined according to the unit voltage drop ΔVunt[1]-ΔVunt[N] and the LED voltage drops $\Delta V_{LED}$ of the light-emitting diodes used in the dimming units UNT[1]~UNT[N]. For illustration purposes, the dimming units UNT[1]~UNT[N] include an equal number of light-emitting diodes in the description. For illustration purposes, the module voltage drop ΔVsum of the dimming module is defined as the sum of the LED voltage drops $\Delta V_{LED}$ of all lighted light-emitting diodes in the dimming module. In other words, the module voltage drop ΔVsum varies with the number of the lighted light-emitting diode units LED[n] in the dimming units UNT[1]~UNT[N]. More lighted light-emitting diode units LED[1]~LED[N] result in higher module voltage drop ΔVsum.

Furthermore, in other embodiments, the control circuit 27 can transmit a current control signal to the branch current sources cS[1]~cS[N] or the common current source cS_com. The current control signal is adapted to set the current value of the branch current sources cS[1]~cS[N] or the common current source cS_com. By adjusting the current value of the branch current sources cS[1]~cS[N] or the common current source cS_com, the dimming current Itune flowing through the dimming module is changed to adjust the overall luminance of the dimming module.

Figure 2:
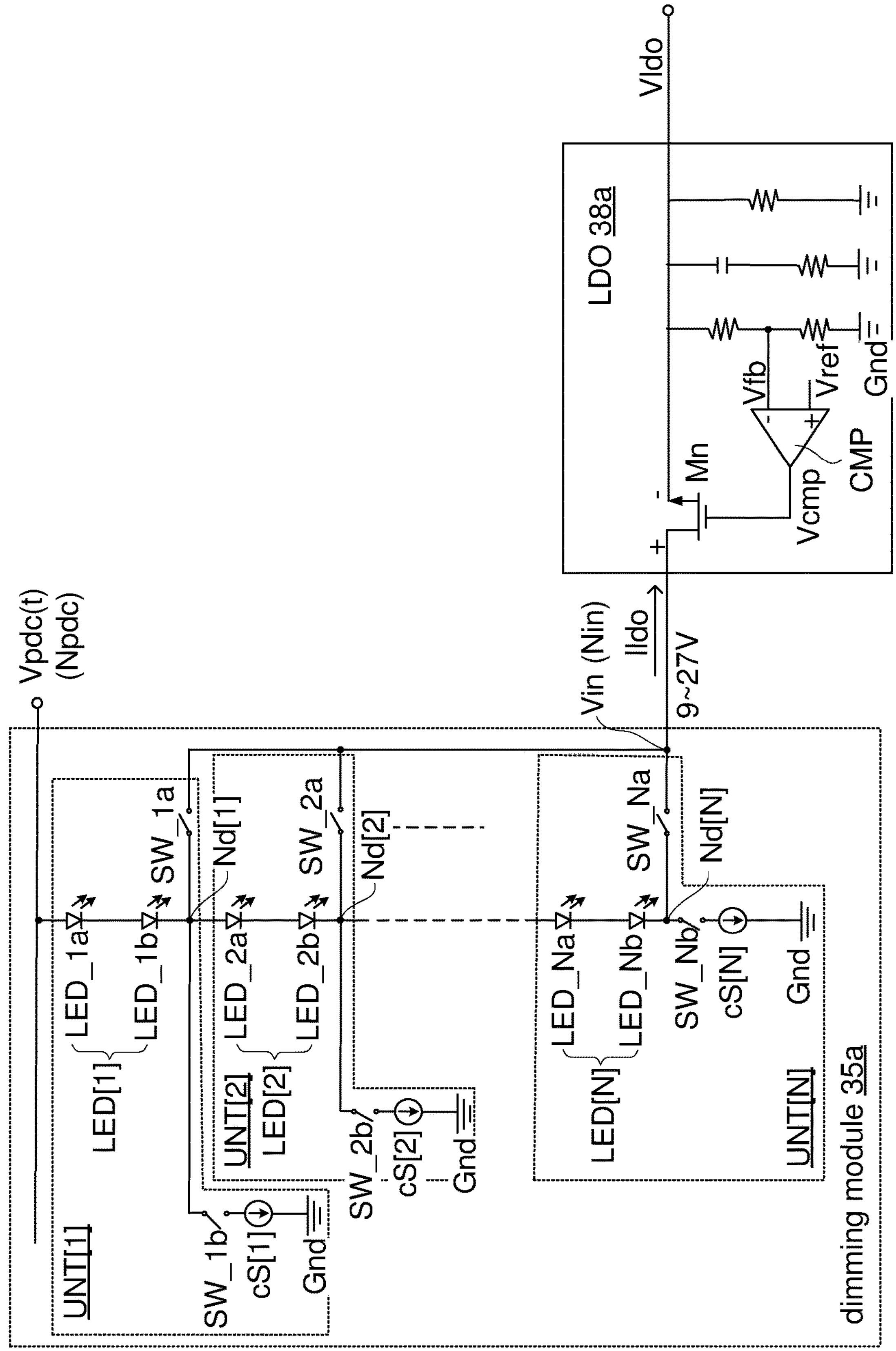
FIG. 2 is a schematic diagram of a dimming module according to a first embodiment of the disclosure.

Please refer to FIG. 2, which is a schematic diagram of a first embodiment according to the disclosure. It is to be noted that only the dimming module **35*a* and the LDO 38*a* are shown in the linear driving module 22 in FIG. 2 to simplify the drawing. Other circuit components and configurations can be seen in FIG. 1, and a similar description is not repeated herein. The dimming module 35*a* includes dimming units UNT[1]~UNT[N]. The light-emitting state of the light-emitting diode units LED[1]~LED[N] of the dimming units UNT[1]~UNT[N] changes with the dimming stage STGn. The input voltage Vin output from the dimming units UNT[1]~UNT[N] to the LDO 38*a*** substantially maintains at a voltage approximate to the regulated voltage Vldo.

The LDO **38*a* includes a comparator CMP adapted to receive a reference voltage Vref having a constant voltage value. Based on the virtual ground property of the comparator CMP, the comparator CMP receives a feedback voltage Vfb equal to the reference voltage Vref (Vfb=Vref). Thus, according to the voltage division rule, the LDO 38*a* can output stable regulated voltage Vldo. The comparator CMP outputs a comparison voltage Vcmp according to the feedback voltage Vfb and the reference voltage Vref to control the turned-on/off state of the transistor Mn of the LDO 38*a*. When the transistor Mn is switched on, the low-dropout current Ildo output from the input terminal Nin flows through the transistor Mn to make LDO 38*a*** output the regulated voltage Vldo.

The dimming units UNT[1], UNT[2], and UNT[N] in FIG. 2 have similar internal components. For illustration purposes, the variable n (n=1~N) is representatively used in the first embodiment to describe the components of the dimming unit UNT[n]. The dimming unit UNT[n] includes a light-emitting diode unit LED[n], a switch unit SW[n], and a branch current source cS[n]. The light-emitting diode unit LED[n] further includes light-emitting diodes LED_na and LED_nb connected in series, and the switch unit SW[n] further includes switches SW_na and SW_nb. The switches SW_na and SW_nb are electrically connected to the control circuit and the light-emitting diode unit LED[n]. The switches SW_na and SW_nb are controlled by the switch signal Sctl[n] to be switched on or switched off synchronously.

The anode of the light-emitting diode LED_na is electrically connected to a voltage-dividing terminal Nd[n-1]. The cathode of the light-emitting diode LED_na is electrically connected to the anode of the light-emitting diode LED_nb. The cathode of the light-emitting diode LED_nb and the switches SW_na, SW_nb are all connected to the voltage-dividing terminal Nd[n]. The other terminal of the switch SW_na is electrically connected to the input terminal Nin, and the other terminal of the switch SW_nb is electrically connected to the branch current source cS[n]. In the case of n=1, the anode of the light-emitting diode LED_1*a* is electrically connected to a pulsed DC terminal Npdc.

Figure 3B:
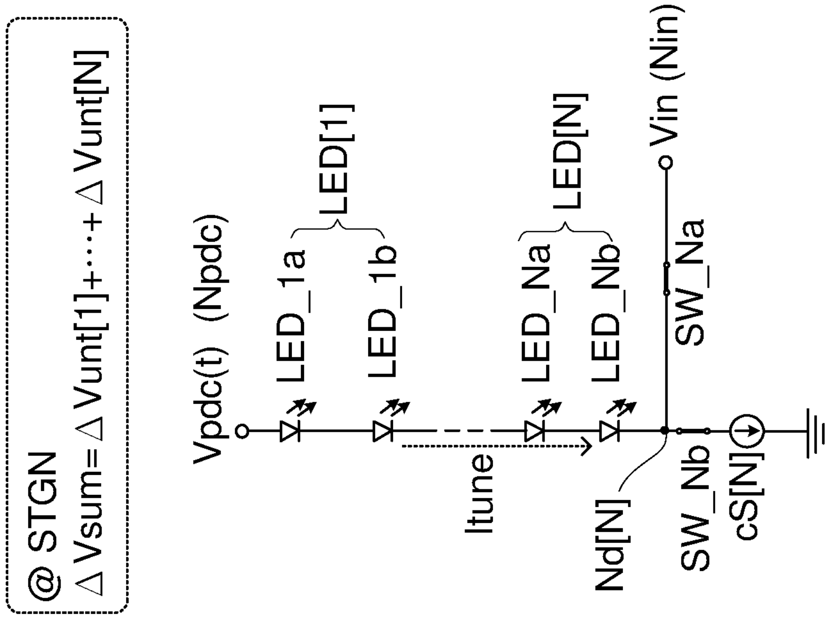
FIGS. 3A and 3B are equivalent circuit diagrams of the dimming module at the dimming stages STG1 and STGN, respectively, according to the first embodiment of the disclosure.
Figure 3A:
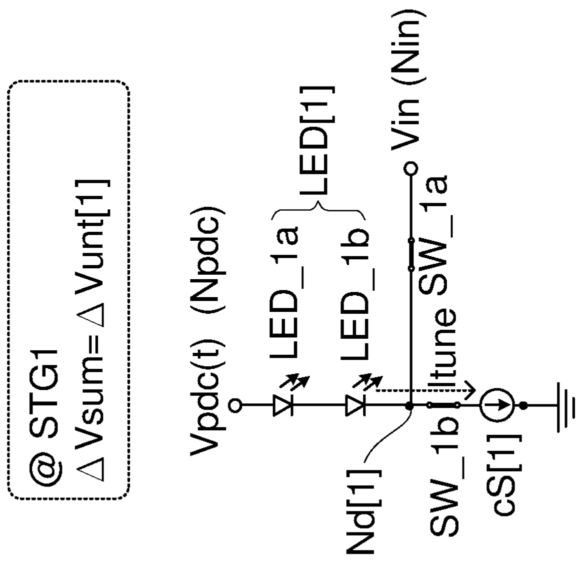

Please refer to FIG. 3A, which is an equivalent circuit diagram of the dimming module 35*a* of FIG. 2 at the dimming stage STG1. At the dimming stage STG1, only the switches SW_1*a* and SW_1*b* are switched on synchronously, and all other switch units SW[2]~SW[N] are switched off. At this time, the dimming current Itune flows from the pulsed DC terminal Npdc and passes through the light-emitting diode unit LED[1], and then is output as the input voltage Vin at the voltage-dividing terminal Nd[1]. Therefore, in FIG. 3A, the module voltage drop ΔVsum is the voltage drop ΔVunt[1] (that is, the sum of $\Delta V_{LED\_1a}$ and $\Delta V_{LED\_1b}$) across the light-emitting diode unit LED[1] (that is, the light-emitting diodes LED_1*a* and LED_1*b*), that is, $\Delta Vsum=\Delta Vunt[1]=\Delta V_{LED\_1a}+\Delta V_{LED\_1b}$. At this time, the input voltage Vin is equal to the difference between the pulsed DC voltage Vpdc(t) and the unit voltage drop ΔVunt [1], that is, Vin=Vpdc(t)ΔVunt[1]. Further, the input voltage Vin is equal to the voltage drop $\Delta V_{cs[1]}$ across the branch current source cS[1], that is, the input voltage Vin=Vpdc(t) $\Delta Vunt[1]=\Delta V_{cs[1]}$.

Please refer to FIG. 3B, which is an equivalent circuit diagram of the dimming module 35*a* of FIG. 2 at the dimming stage STGN. At the dimming stage STGN, only the switches SW_Na and SW_Nb are switched on synchronously, and all other switches SW_1*a*~SW_(N-1)a and SW_1*b*~SW_(N-1)b are switched off. At this time, the dimming current Itune flows from the pulsed DC terminal Npdc and passes through the light-emitting diode units LED[1]~LED[N], and then is output as the input voltage Vin at the voltage-dividing terminal Nd[N]. Therefore, in FIG. 3B, the module voltage drop ΔVsum is the sum of the voltage drops $\Delta V_{LED}$ of the light-emitting diode units LED [1]~LED[N] in the light-on state, that is, the module voltage drop $\Delta Vsum=\Sigma_{n=1}^{N}\Delta Vunt[n]=\Sigma_{n=1}^{N}(\Delta V_{LED\_na}+\Delta V_{LED\_nb})$. At this time, the input voltage Vin is equal to the difference between the pulsed DC voltage Vpdc(t) and the sum of the unit voltage drops ΔVunt[1]~ΔVunt[N], that is, $Vin=Vpdc(t)-\Sigma_{n=1}^{N}\Delta Vunt[n]$. Further, the input voltage Vin is equal to the voltage drop $\Delta V_{cS[N]}$ across the branch current source cS[N]. That is, the input voltage $Vin=Vpdc(t)-\Sigma_{n=1}^{N}\Delta Vunt[n]=\Delta V_{cS[N]}$.

Figure 4:
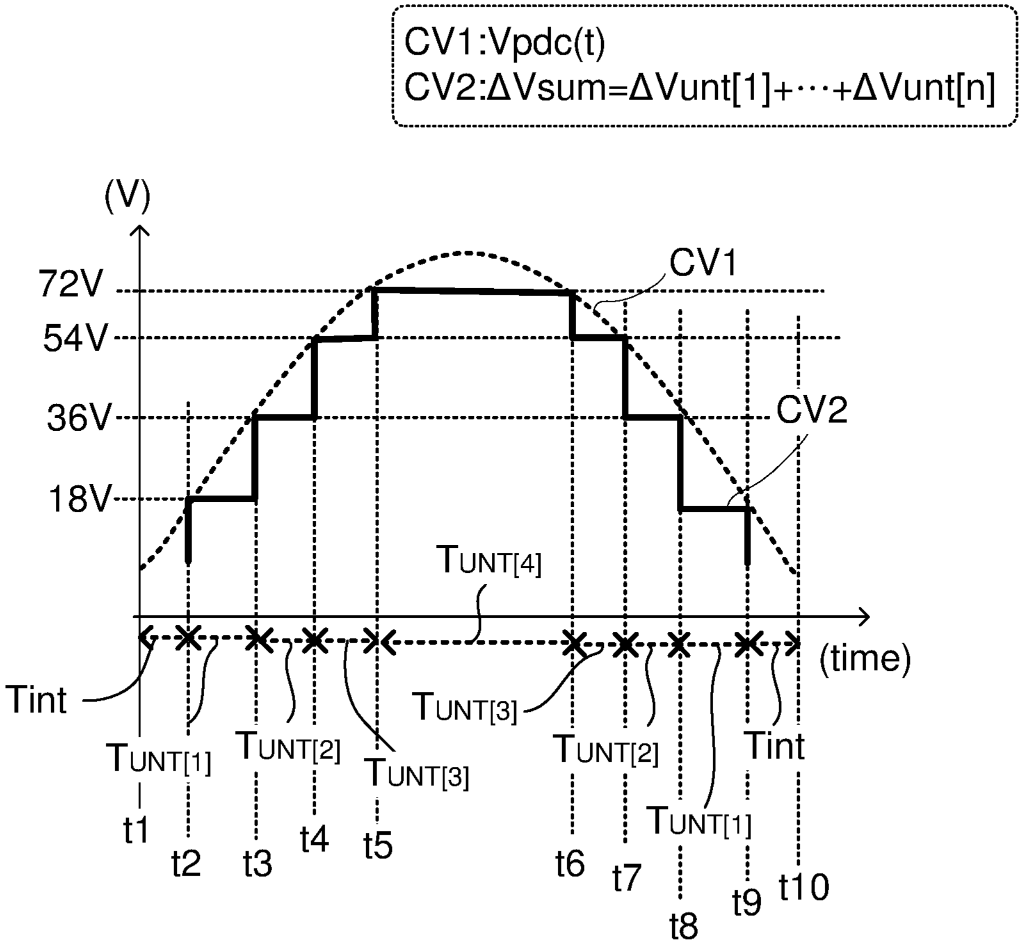
FIG. 4 is a wave graph showing voltages with reference to the dimming module and the LDO according to the disclosure in a case of N=4.

Please refer to FIG. 4, which is a wave graph showing voltages with reference to the dimming module and the LDO according to the disclosure in a case of N=4. In FIG. 4, voltage is on the vertical axis and time is on the horizontal axis. The wave CV1 corresponds to the pulsed DC voltage Vpdc(t), and the wave CV2 corresponds to the module voltage drop ΔVsum.

During an initial period Tint (the time points t1~t2 and t9~t10), the dimming module 35*a* is set at an initial stage STGint, and all the switches SW_1*a*~SW_4*a* and SW_1*b*~SW_4*b* are switched off. At this time, no light-emitting diode unit emits light.

During a dimming period $T_{UNT}[1]$ (the time points t2~t3 and t8~t9), at a dimming stage STG1, only the switches SW_1*a* and SW_1*b* are switched on, and the switches SW_2*a*, SW_2*b*, SW_3*a*, SW_3*b*, SW_4*a*, and SW_4*b* are switched off. At this time, the dimming current Itune flows through the light-emitting diode unit LED[1]. Therefore, the module voltage drop ΔVsum is equal to the voltage drop across the light-emitting diode unit LED[1], that is, ΔVsum=ΔVunt[1]. Accordingly, the input voltage Vin is expressed as the voltage difference between the pulsed DC voltage Vpdc(t) and the module voltage drop ΔVsum, that is, Vin=Vpdc(t)−ΔVsum=Vpdc(t)−ΔVunt[1].

During a dimming period $T_{UNT}[2]$ (the time points t3~t4 and t7~t8), at a dimming stage STG2, only the switches SW_2*a* and SW_2*b* are switched on, and other switches SW_1*a*, SW_1*b*, SW_3*a*, SW_3*b*, SW_4*a*, and SW_4*b* are switched off. At this time, the dimming current Itune flows through the light-emitting diode units LED[1] and LED[2] connected in series. Therefore, the module voltage drop ΔVsum is equal to the sum of the voltage drops across the light-emitting diode units LED[1] and LED[2], that is, ΔVsum=ΔVunt[1]+ΔVunt[2]. Accordingly, the input voltage Vin is expressed as the voltage difference between the pulsed DC voltage Vpdc(t) and the module voltage drop ΔVsum, that is, Vin=Vpdc(t)−ΔVsum=Vpdc(t)−(ΔVunt[1]+ΔVunt [2]).

During a dimming period $T_{UNT}[3]$ (the time points t4~t5 and t6~t7), at a dimming stage STG3, only the switches SW_3*a* and SW_3*b* are switched on, and other switches SW_1*a*, SW_1*b*, SW_2*a*, SW_2*b*, SW_4*a*, and SW_4*b* are switched off. At this time, the dimming current Itune flows through the light-emitting diode units LED[1], LED[2], and LED[3] connected in series. Therefore, the module voltage drop ΔVsum is equal to the sum of the voltage drops across the light-emitting diode units LED[1]~LED[3], that is, $\Delta Vsum=\Sigma_{n=1}^{3}\Delta Vunt[n]$. Accordingly, the input voltage Vin is expressed as the voltage difference between the pulsed DC voltage Vpdc(t) and the module voltage drop ΔVsum, that is, $Vin=Vpdc(t)-\Delta Vsum=Vpdc(t)-\Sigma_{n=1}^{3}\Delta Vunt[n]$.

During a dimming period $T_{UNT}[4]$ (the time points t5~t6), at a dimming stage STG4, the switches SW_1*a*, SW_1*b*, SW_2*a*, SW_2*b*, SW_3*a*, and SW_3*b* are switched off, and only the switches SW_4*a* and SW_4*b* are switched on. At this time, the dimming current Itune flows through the light-emitting diode units LED[1]~LED[4] connected in series. Therefore, the module voltage drop ΔVsum is equal to the sum of the voltage drops across the light-emitting diode units LED[1]~LED[4], that is, $\Delta Vsum=\Sigma_{n=1}^{4}\Delta Vunt[n]$. Accordingly, the input voltage Vin is expressed as the voltage difference between the pulsed DC voltage Vpdc(t) and the module voltage drop ΔVsum, that is, $Vin=Vpdc(t)-\Delta Vsum=Vpdc(t)-\Sigma_{n=1}^{4}\Delta Vunt[n]$.

As shown in FIG. 4, even though the pulsed DC voltage Vpdc(t) varies with time, the input voltage Vin will not have a significant change. The higher the pulsed DC voltage Vpdc(t) (corresponding to the wave CV1) is, the higher the module voltage drop ΔVsum (corresponding to the wave CV2) is. Hence, the input voltage Vin=Vpdc(t)−ΔVsum derived from the difference (that is, the region corresponding to the wave CV1 minus the wave CV2) has no significant change.

Figure 5:
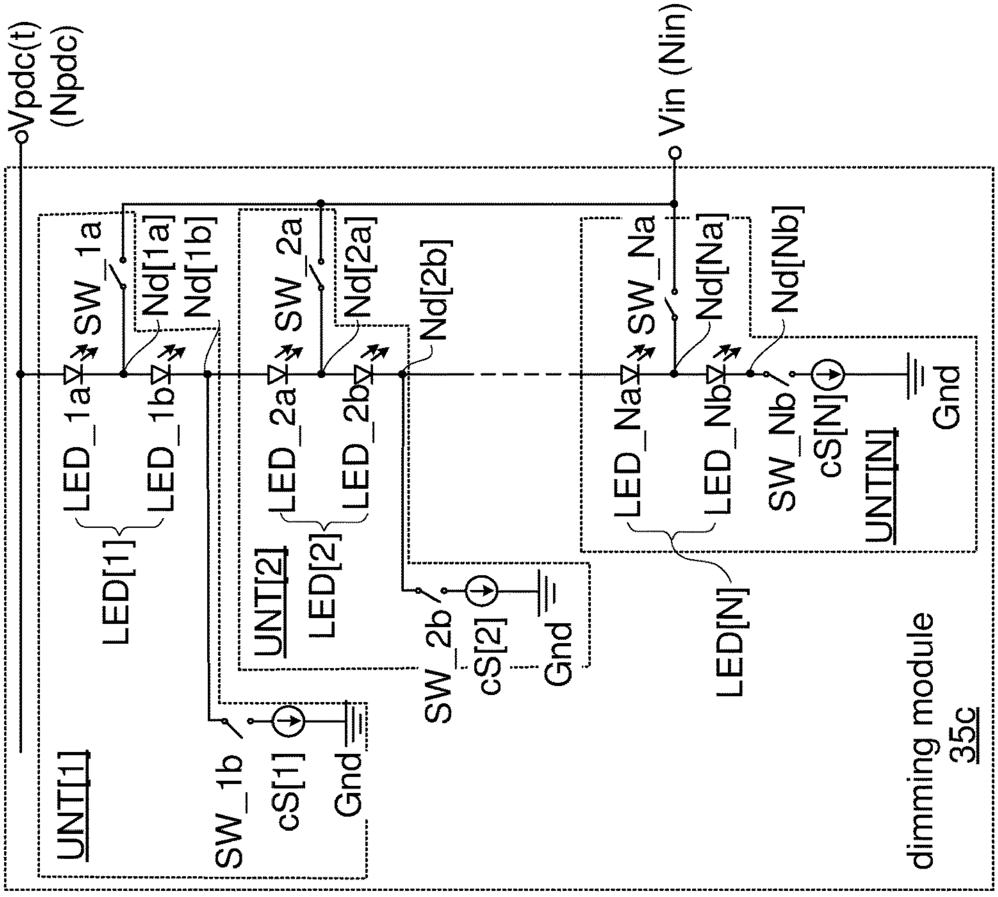
FIG. 5 is a schematic diagram of a dimming module modified from the first embodiment of the disclosure.

Please refer to FIG. 5, which is a schematic diagram of a dimming module modified from the first embodiment of the disclosure. The components of the dimming unit UNT[n] are described first.

Please refer to both FIGS. 2 and 5. The dimming units UNT[1]~UNT[N] of the dimming module 35*c* have similar components to those of the dimming module 35*a*, and a similar description is not repeated herein. It is to be noted that, in FIG. 5, the light-emitting diode LED_na is electrically connected to the switch SW_na, and the light-emitting diode LED_nb is electrically connected to the light-emitting diode LED_na, the switch SW_na and the switch SW_nb. Specifically, the voltage-dividing terminal Nd[n] includes voltage-dividing terminals Nd[na] and Nd[nb]. The terminal connected to the light-emitting diode LED_na and the switch SW_na is defined as the voltage-dividing terminal Nd[na], and the terminal connected to the light-emitting diode LED_nb and the switch SW_nb is defined as the voltage-dividing terminal Nd[nb]. The anode of the light-emitting diode LED_na is electrically connected to the voltage-dividing terminal Nd[(n-1)b]. The cathode of the light-emitting diode LED_na, the switch SW_na, and the anode of the light-emitting diode LED_nb are all electrically connected to the voltage-dividing terminal Nd[na]. In the case of n=1, the anode of the light-emitting diode LED_1*a* is electrically connected to the pulsed DC terminal Npdc. The cathode of the light-emitting diode LED_nb and one terminal of the switch SW_nb are both connected to the voltage-dividing terminal Nd[nb]. The other terminal of the switch SW_nb is electrically connected to the branch current source cS[n]. One terminal of the switch SW_na is electrically connected to the voltage-dividing terminal Nd[na], and the other terminal is electrically connected to the input terminal Nin. The position of the voltage-dividing terminal Nd[nb] in FIG. 5 is considered as the position of the voltage-dividing terminal Nd[n] in FIG. 2. In this embodiment, although the switches SW_na and SW_nb are electrically connected to the voltage-dividing terminals Nd[na] and Nd[nb], respectively, they are still switched on or switched off synchronously.

Figure 6A:
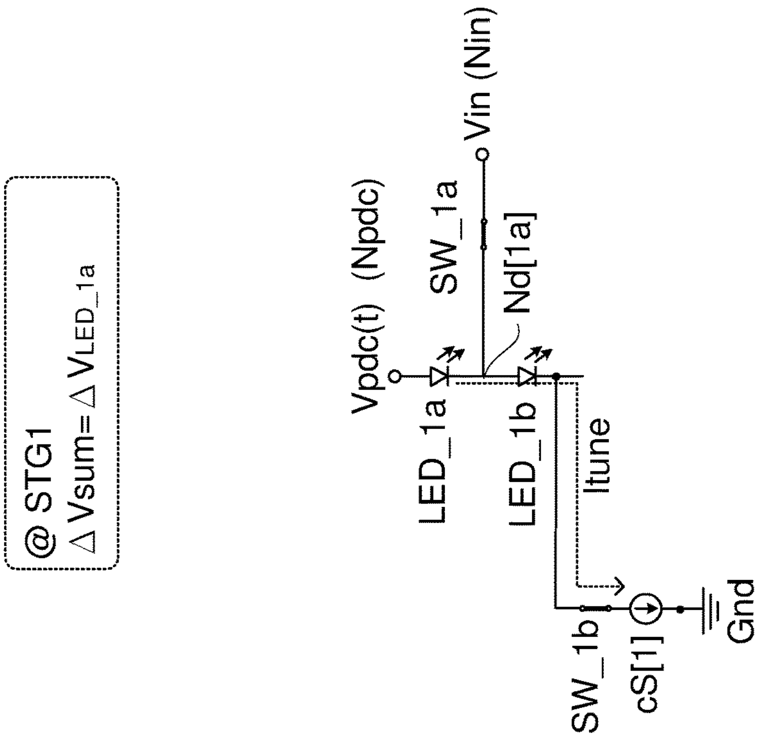
FIGS. 6A and 6B are equivalent circuit diagrams of the dimming module of FIG. 5 at the dimming stages STG1 and STGN, respectively.

Please refer to FIG. 6A, which is an equivalent circuit diagram of the dimming module of FIG. 5 at the dimming stage STG1. When the dimming module 35*c* is at the dimming stage STG1, only the switches SW_1*a* and SW_1*b* are switched on, and other switches SW_2*a*~SW_Na and SW_2*b*~SW_Nb are all switched off. At this time, the dimming current Itune generated at the pulsed DC terminal Npdc flows to the branch current source cS[1] through the light-emitting diode unit LED[1] and the turned-on switch SW_1*b*. On the other hand, the turned-on switch SW_1*a* conducts the voltage at the voltage-dividing terminal Nd[1a] to the LDO 38*a* to serve as the input voltage Vin of the LDO 38*a*.

According to the path of the dimming current Itune, it is obtained that the module voltage drop ΔVsum is equal to the voltage drop $\Delta V_{LED\_1a}$ across the light-emitting diode LED_1*a*, that is, $\Delta Vsum=\Delta V_{LED\_1a}$. At this time, the input voltage Vin is expressed as $Vin=Vpdc(t)-\Delta V_{LED\_1a}$. Further, the input voltage Vin is also equal to the sum of the voltage drop $\Delta V_{LED\_1b}$ across the light-emitting diode LED_1*b* and the voltage drop $\Delta V_{cs[1]}$ across the branch current source cS[1], that is, $Vin=\Delta V_{LED\_1b}+\Delta V_{cS[1]}$.

Figure 6B:
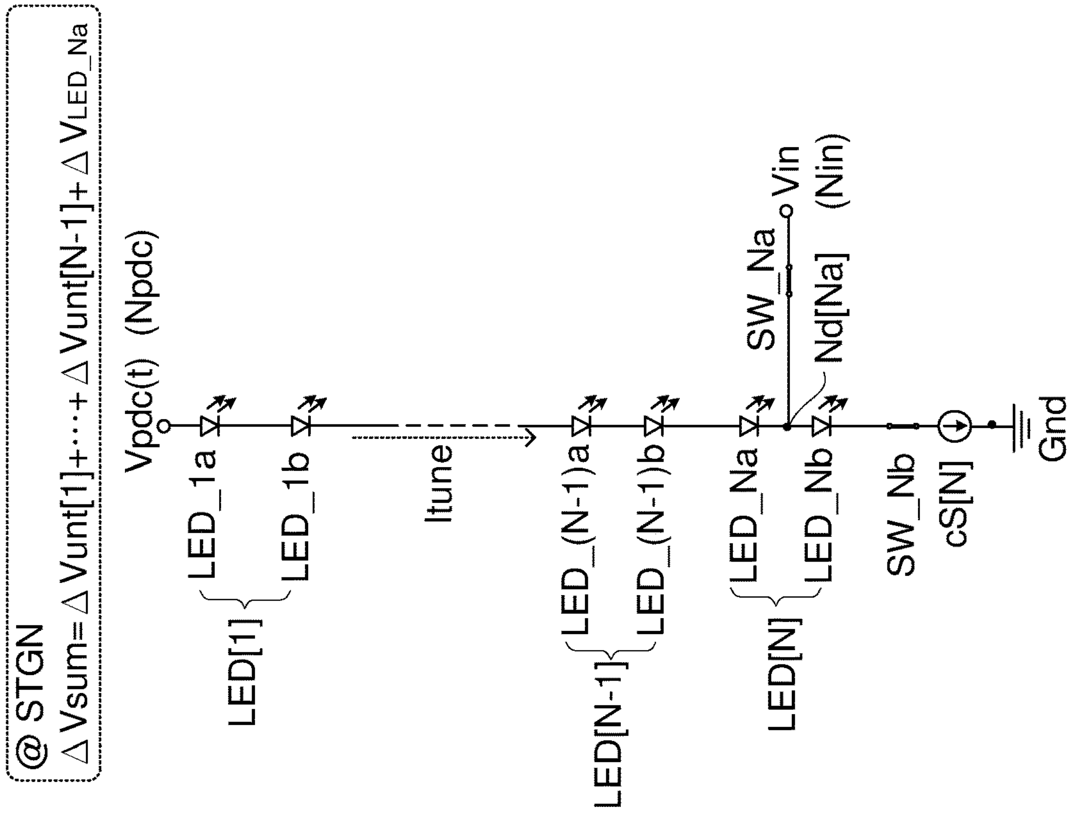

Please refer to FIG. 6B, which is an equivalent circuit diagram of the dimming module of FIG. 5 at the dimming stage STGN. When the dimming module 35*c* is at the dimming stage STGN, only the switch SW_Na and SW_Nb are switched on, and other switches SW_1*a*~SW (N-1)a and SW_1*b*~SW (N−1)b are all switched off. At this time, the dimming current Itune generated at the pulsed DC terminal Npdc flows to the branch current source cS[N] through the light-emitting diode units LED[1]~LED[N] and the turned-on switch SW_Nb. On the other hand, the turned-on switch SW_Na conducts the voltage at the voltage-dividing terminal Nd[Na] to the LDO 38*a* to serve as the input voltage Vin of the LDO 38*a*.

According to the path of the dimming current Itune, it is obtained that the module voltage drop ΔVsum is equal to the sum of the unit voltage drops across the dimming units UNT[1]~UNT[N−1] and the voltage drop $\Delta V_{LED\_Na}$ across the light-emitting diode LED_Na, that is, $\Delta Vsum=\Sigma_{n=1}^{N-1}\Delta Vunt[n]+\Delta V_{LED\_Na}$. At this time, the input voltage Vin is expressed as $Vin=Vpdc(t)-(\Sigma_{n=1}^{N-1}\Delta Vunt[n]+\Delta V_{LED\_Na})$. Further, the input voltage Vin is also equal to the sum of the voltage drop $\Delta V_{LED\_Nb}$ across the light-emitting diode LED_Nb and the voltage drop $\Delta V_{cS[N]}$ across the branch current source cS[N]. That is, $Vin=\Delta V_{LED\_Nb}+\Delta V_{cS[N]}$.

Figure 7:
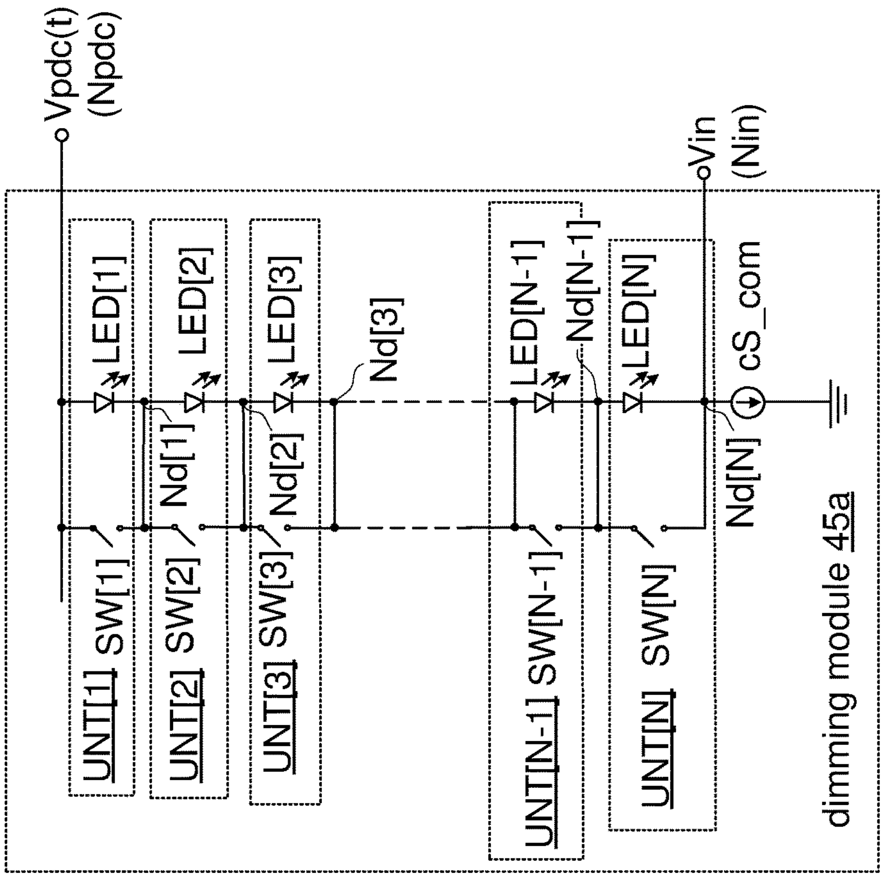
FIG. 7 is a schematic diagram of a dimming module according to a second embodiment of the disclosure.

Please refer to FIG. 7, which is a schematic diagram of a dimming module according to a second embodiment of the disclosure. The dimming module 45*a* includes: dimming units UNT[1]~UNT[N] and a common current source cS_com. The common current source cS_com is electrically connected to the control circuit and the Nth dimming unit UNT[N]. The dimming unit UNT[1] is electrically connected between the pulsed DC terminal Npdc and the voltage-dividing terminal Nd[1]; the dimming unit UNT[2] is electrically connected between the voltage-dividing terminals Nd[1] and Nd[2]; and so on. Each dimming unit UNT[n] (n=1~N) includes a light-emitting diode unit LED [n] and a switch unit SW[n] connected in parallel. Each switch unit SW[n] is electrically connected to the control circuit and is selectively switched on or switched off in response to the switch signal Sctl[n]. When the switch unit SW[n] is switched on in response to the switch signal Sctl[n], the light-emitting diode unit LED[n] of the dimming unit UNT[n] is in a light-off state; and when the switch unit UNT[n] is switched off in response to the switch signal Sctl[n], the light-emitting diode unit LED[n] of the dimming unit UNT[n] is in a light-on state. The common current source cS_com is electrically connected to the voltage-dividing terminal Nd[N] and the ground voltage Gnd.

For illustration purposes, the light-emitting diode unit LED[n] includes a single light-emitting diode LED in the embodiment. However, in real applications, the number of light-emitting diodes included in the light-emitting diode unit LED[n] is not limited. Moreover, different light-emitting diode units of the dimming module may include different numbers of light-emitting diodes.

In this embodiment, the control of the dimming unit UNT[n] based on the dimming stages is not limited. For example, FIGS. 8A, 8B, 8C and FIGS. 9A, 9B, and 9C illustrate the processes that the number of the light-emitting diode units LED[n] in the light-on state is changed at different dimming stages, and they are turned on in a sequence starting from the top downwards and in a sequence starting from bottom upwards, respectively. In real applications, the dimming units UNT[1]~UNT[N] based on the architecture of the second embodiment can be independently controlled and individually switched among states. Hence, the position of the light-emitting diode unit LED[n] in the light-on state is not limited to the embodiment. This modification in different applications is not described in detail herein.

Figure 8C:
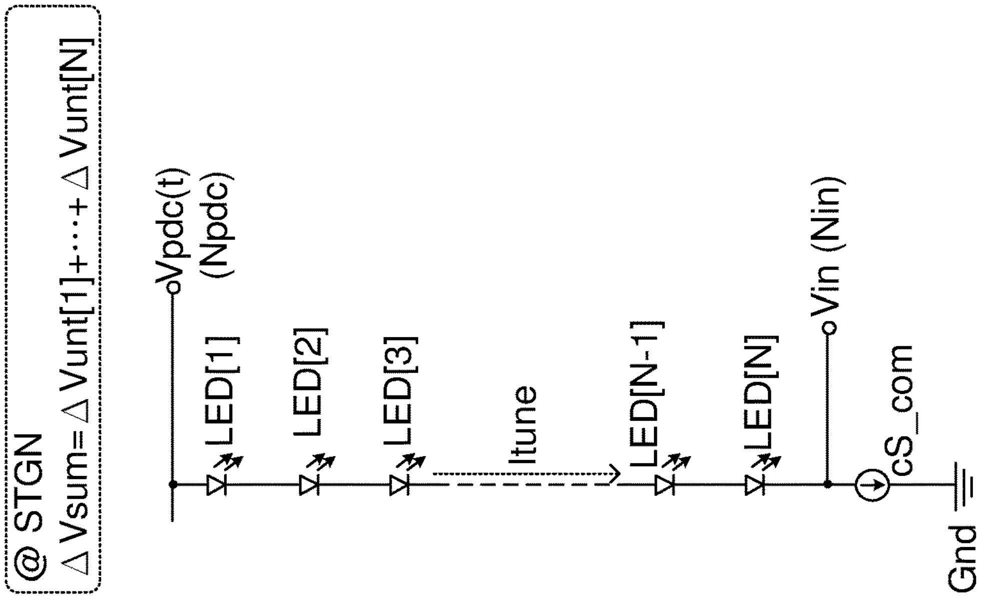
FIGS. 8A, 8B, and 8C are equivalent circuit diagrams of the dimming module of the second embodiment of the disclosure wherein more dimming units UNT[n], in a sequence starting from the top downwards, are in the light-on state at a higher dimming stage STG.
Figure 8B:
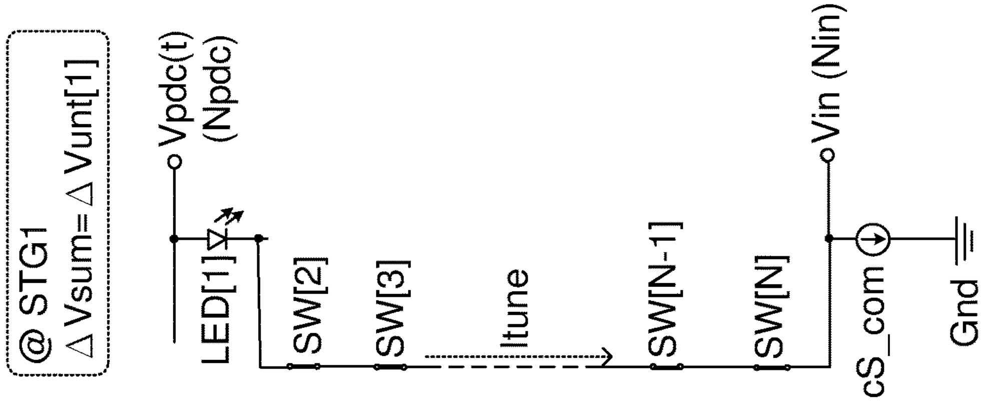
Figure 8A:
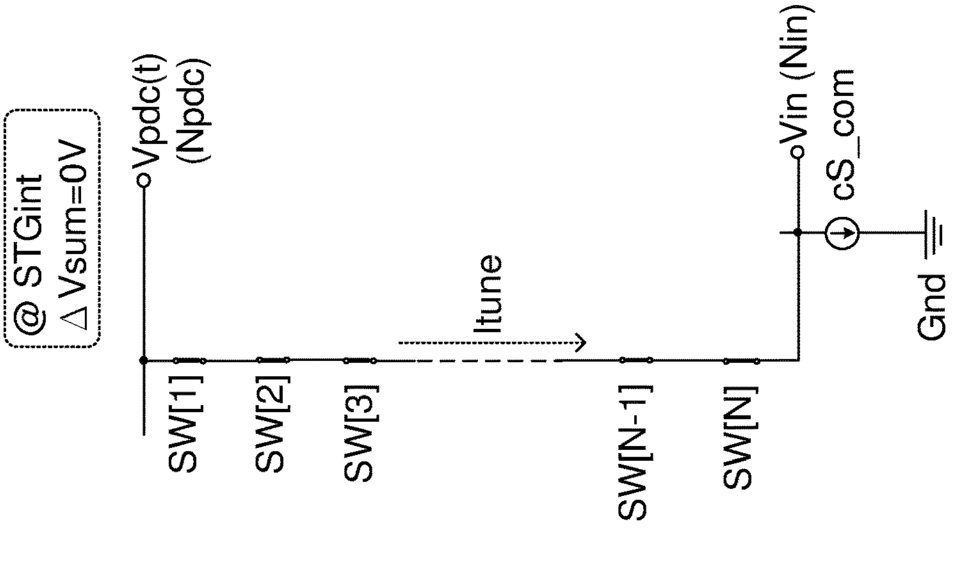

FIGS. 8A, 8B, and 8C show that more dimming units UNT[n], in a sequence starting from the top downwards, are in the light-on state at a higher dimming stage STG.

Please refer to FIG. 8A, which is an equivalent circuit of the dimming module 45*a* of FIG. 7 at the initial state STGint. When the dimming module 45*a* is at the initial state STGint, the switch units SW[1]~SW[N] are all switched on, and all of the light-emitting diode units LED[1]~LED[N] are lightless. In FIG. 8A, the dimming current Itune flows from the pulsed DC terminal Npdc to the common current source cS_com through the switch units SW[1]~SW[N]. According to the path of the dimming current Itune, it is obtained that the module voltage drop ΔVsum is expressed as ΔVsum=0V, and the input voltage Vin is equal to the pulsed DC voltage Vpdc(t), that is, Vin=Vpdc(t). Further, the input voltage Vin is expressed as the voltage drop $\Delta V_{cS\_com}$ across the common current source cS_com, that is, $Vin=\Delta V_{cS\_com}$.

Please refer to FIG. 8B, which is an equivalent circuit of the dimming module 45*a* of FIG. 7 at the dimming stage STG1. When the dimming module 45*a* is at the dimming stage STG1, only the switch unit SW[1] is switched off, and other switch units SW[2]~SW[N] are all switched on. Therefore, only the light-emitting diode unit LED[1] emits light. In FIG. 8B, the dimming current Itune flows from the pulsed DC terminal Npdc to the common current source cS_com through the light-emitting diode unit LED[1] and the switch units SW[2]~SW[N]. According to the path of the dimming current Itune, it is obtained that the module voltage drop ΔVsum is expressed as $\Delta Vsum=\Delta Vunt[1]=\Delta V_{LED}$ [1], and the input voltage Vin is equal to the difference by subtracting the module voltage drop ΔVsum from the pulsed DC voltage Vpdc(t), that is, Vin=Vpdc(t)−ΔVsum=Vpdc(t)−ΔVunt[1]. Further, the input voltage Vin is expressed as the voltage drop $\Delta V_{cS\_com}$ across the common current source cS_com, that is, $Vin=\Delta V_{cS\_com}$.

Please refer to FIG. 8C, which is an equivalent circuit of the dimming module 45*a* of FIG. 7 at the dimming stage STGN. When the dimming module 45*a* is at the dimming stage STGN, the switch units SW[1]~SW[N] are all switched off. Therefore, all of the light-emitting diode units LED[1]~LED[N] connected in series emit light. In FIG. 8C, the dimming current Itune flows from the pulsed DC terminal Npdc to the common current source cS_com through the light-emitting diode units LED[1]~LED[N]. According to the path of the dimming current Itune, it is obtained that the module voltage drop ΔVsum is expressed as $\Delta Vsum=\Sigma_{n=1}^{N}\Delta Vunt[n]=\Sigma_{n=1}^{N}\Delta V_{LED[n]}$, and the input voltage Vin is equal to the difference by subtracting the module voltage drop ΔVsum from the pulsed DC voltage Vpdc(t), that is, $Vin=Vpdc(t)-\Delta Vsum=Vpdc(t)-_{1}\Delta Vunt[n]=Vpdc(t)-\Sigma_{n=1}^{N}\Delta V_{LED[n]}$. Further, the input voltage Vin is expressed as the voltage drop $\Delta V_{cS\_com}$ across the common current source cS_com, that is, $Vin=\Delta V_{cS\_com}$.

Please refer to FIGS. 8A, 8B and 8C. As using the methods illustrated in FIGS. 8A, 8B and 8C to control the dimming module 45*a* of FIG. 7, the switch units SW[1]~SW[n] are switched off and the switch units SW[n+1]~SW[N] are switched on at the dimming stage STGn. Further, the light-emitting diode units LED[1]~LED[n] emit light because of the turned-off switch units SW[1]~SW[n], and the light-emitting diode units LED[n+1]~LED[N]do not emit light because of the turned-on switch units SW[n+1]~SW[N]. Hence, when the n value increases, there are fewer turned-on switch units SW[n+1]~SW[N], and more dimming units UNT[1]~UNT[n], in a sequence starting from the top downwards, are in the light-on state.

Figure 9C:
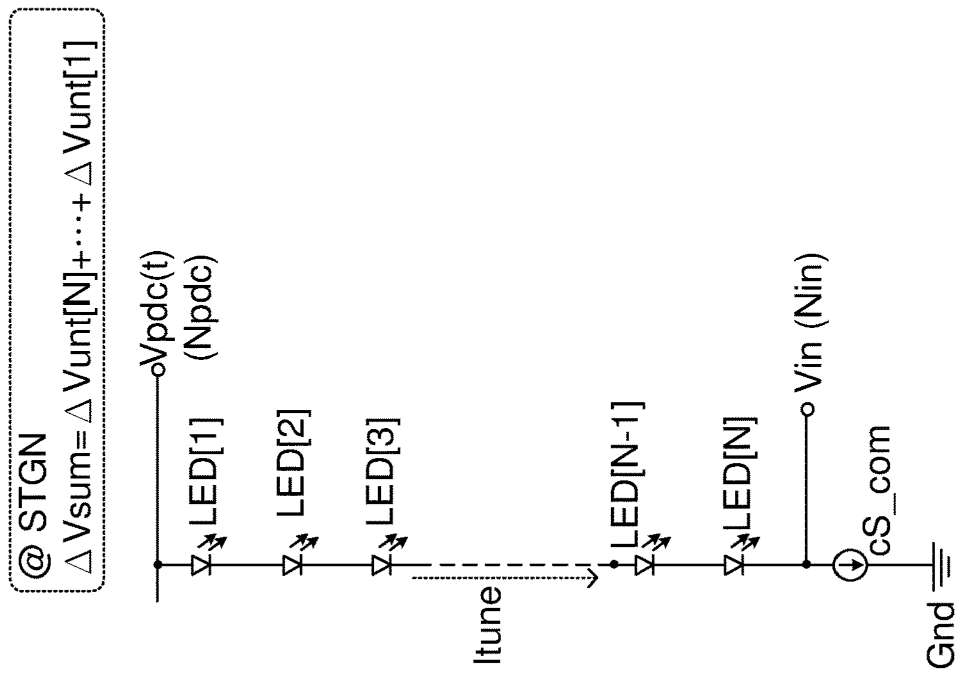
FIGS. 9A, 9B, and 9C are equivalent circuit diagrams of the dimming module of the second embodiment of the disclosure wherein more dimming units UNT[n], in a sequence from the bottom upwards, are in the light-on state at a higher dimming stage STG.
Figure 9B:
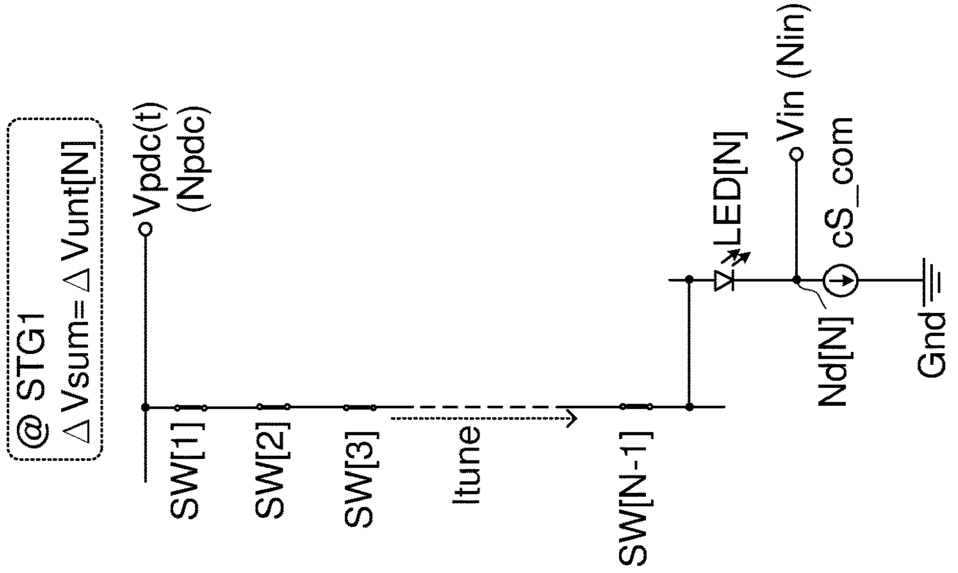
Figure 9A:
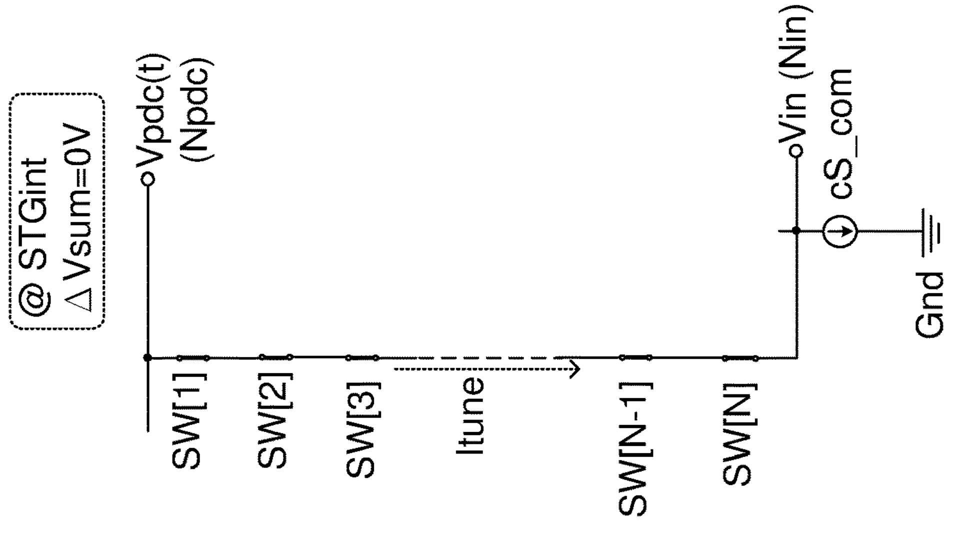

FIGS. 9A, 9B, and 9C show that more dimming units UNT[n], in a sequence starting from bottom upwards, are in the light-on state at a higher dimming stage STG.

Please refer to FIG. 9A, which is an equivalent circuit of the dimming module 45*a* of FIG. 7 at the initial state STGint. When the dimming module 45*a* is at the initial state STGint, the switch units SW[1]~SW[N] are all switched on, and all of the light-emitting diode units LED[1]~LED[N] are lightless.

In FIG. 9A, the dimming current Itune flows from the pulsed DC terminal Npdc to the common current source cS_com through the switch units SW[1]~SW[N]. According to the path of the dimming current Itune, it is obtained that the module voltage drop ΔVsum is expressed as ΔVsum=0V, and the input voltage Vin is equal to the voltage drop $\Delta V_{cS\_com}$ across the common current source cS_com, that is, $Vin=\Delta V_{cS\_com}$.

Please refer to FIG. 9B, which is an equivalent circuit of the dimming module 45*a* of FIG. 7 at the dimming stage STG1. When the dimming module 45*a* is at the dimming stage STG1, only the switch unit SW[N] is switched off, and other switch units SW[1]~SW[N−1] are all switched on. Therefore, only the light-emitting diode unit LED[N] emits light.

In FIG. 9B, the dimming current Itune flows from the pulsed DC terminal Npdc to the common current source cS_com through the switch units SW[1]~SW[N−1] and the light-emitting diode unit LED[N]. According to the path of the dimming current Itune, it is obtained that the module voltage drop ΔVsum is expressed as $\Delta Vsum=\Delta Vunt[N]=\Delta V_{LED}$ [N], and the input voltage Vin is equal to the difference by subtracting the module voltage drop ΔVsum from the pulsed DC voltage Vpdc(t), that is, Vin=Vpdc(t)−ΔVsum=Vpdc(t)−ΔVunt[N]. Further, the input voltage Vin is equal to the voltage drop $\Delta V_{cS\_com}$ across the common current source cS_com, that is, $Vin=\Delta V_{cS\_com}$.

Please refer to FIG. 9C, which is an equivalent circuit of the dimming module 45*a* of FIG. 7 at the dimming stage STGN. When the dimming module 45*a* is at the dimming stage STGN, the switch units SW[1]~SW[N] are all switched off. Therefore, all the light-emitting diode units LED[1]~LED[N] connected in series emit light.

In FIG. 9C, the dimming current Itune flows from the pulsed DC terminal Npdc to the common current source cS_com through the light-emitting diode units LED[1]~LED[N]. According to the path of the dimming current Itune, it is obtained that the module voltage drop ΔVsum is expressed as $\Delta Vsum=\Sigma_{n=1}^{N}\Delta Vunt[n]=\Sigma_{n=1}^{N}\Delta V_{LED[n]}$, and the input voltage Vin is equal to the difference by subtracting the module voltage drop ΔVsum from the pulsed DC voltage Vpdc(t), that is, $Vin=Vpdc(t)-\Delta Vsum=Vpdc(t)-\Sigma_{n=}1^{N}\Delta Vunt[n]=Vpdc(t)-\Sigma_{n=1}^{N}\Delta V_{LED[n]}$. Further, the input voltage Vin is equal to the voltage drop $\Delta V_{cS\_com}$ across the common current source cS_com, that is, $Vin=\Delta V_{cS\_com}$.

Please refer to FIGS. 9A, 9B and 9C. As using the methods illustrated in FIGS. 9A, 9B and 9C to control the dimming module 45*a* of FIG. 7, the switch units SW[1]~SW[N-n] are switched on and the switch units SW[N-n+1]~SW[N] are switched off at the dimming stage STGn. Further, the light-emitting diode units LED[1]~LED[N-n] do not emit light because of the turned-on switch units SW[1]~SW[N-n], and the light-emitting diode units LED[N-n+1]~LED[N] emit light because of the turned-off switch units SW[N-n+1]~SW[N]. Hence, when the n value increases, there are fewer turned-on switch units SW[1]~SW[N-n], and more dimming units UNT[N-n+1]~UNT[N], in a sequence starting from bottom upwards, are in the light-on state.

Please refer to FIGS. 8A, 8B, 8C, 9A, 9B and 9C. From FIGS. 8A and 9A, no matter whether the light-emitting diode units in the light-on state are arranged from the top downwards or from the bottom upwards, the module voltage drop ΔVsum is 0V at the initial stage STGint, and the input voltage Vin is equal to the voltage drop $\Delta V_{cS\_com}$ across the common current source cS_com. Similarly, as shown in FIGS. 8C and 9C, no matter whether the light-emitting diode units in the light-on state are arranged from the top downwards or from the bottom upwards, the module voltage drop ΔVsum keeps the same ($\Delta Vsum={}_1\Sigma_{n=1}^{N}\Delta Vunt[n]=\Sigma_{n=1}^{N}\Delta V_{LED[n]}$) at the dimming stage STGN, and the input voltage Vin is equal to the voltage drop $\Delta V_{cS\_com}$ across the common current source cS_com.

Figure 10:
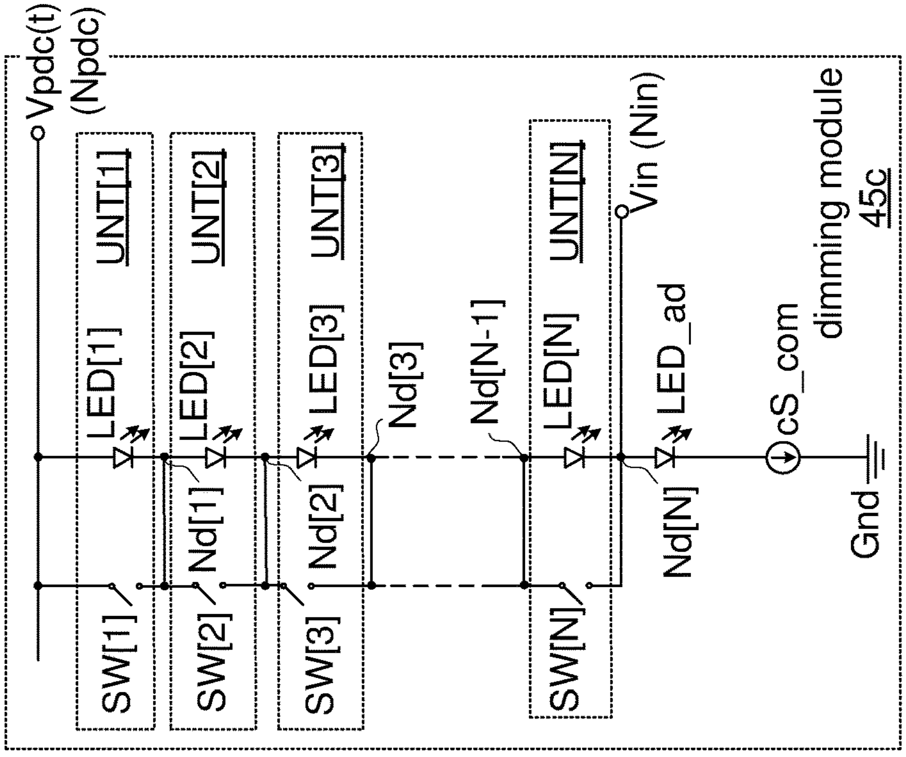
FIG. 10 is a schematic diagram of a dimming module modified from the second embodiment of the disclosure.

Please refer to FIG. 10, which is a schematic diagram of a dimming module modified from the second embodiment of the disclosure. Please refer to both FIGS. 7 and 10. Comparing the dimming modules 45*a* and 45*c*, it is shown that in addition to the dimming units UNT[1]~UNT[N], the dimming module 45*c* further includes an auxiliary light-emitting diode LED_ad. The auxiliary light-emitting diode LED_ad is electrically connected to the dimming unit UNT[N], and the common current source cS_com is electrically connected to the control circuit and the auxiliary light-emitting diode LED_ad.

Adopting the architecture of FIG. 10, regardless of the stage of the dimming module 45*c*, the auxiliary light-emitting diode LED_ad keeps in the light-on state. Therefore, the input voltage Vin is equal to the sum of the voltage drop $\Delta V_{cS\_com}$ across the common current source cS_com and the voltage drop $\Delta V_{LED\_ad}$ across the auxiliary light-emitting diode LED_ad, that is, $Vin=\Delta V_{cS\_com}+\Delta V_{LED\_ad}$.

Since the dimming modules 45*a* and 45*c* have similar architecture, the operation of the dimming module 45*c* is not repeated herein. As the description in the embodiment of FIG. 7, the control circuit does not limit the control sequence of the dimming module 45*c* in FIG. 10. Hence, the control procedures related to FIGS. 8A-8C and 9A-9C are also applicable to FIG. 10 after proper modification.

Figure 11:
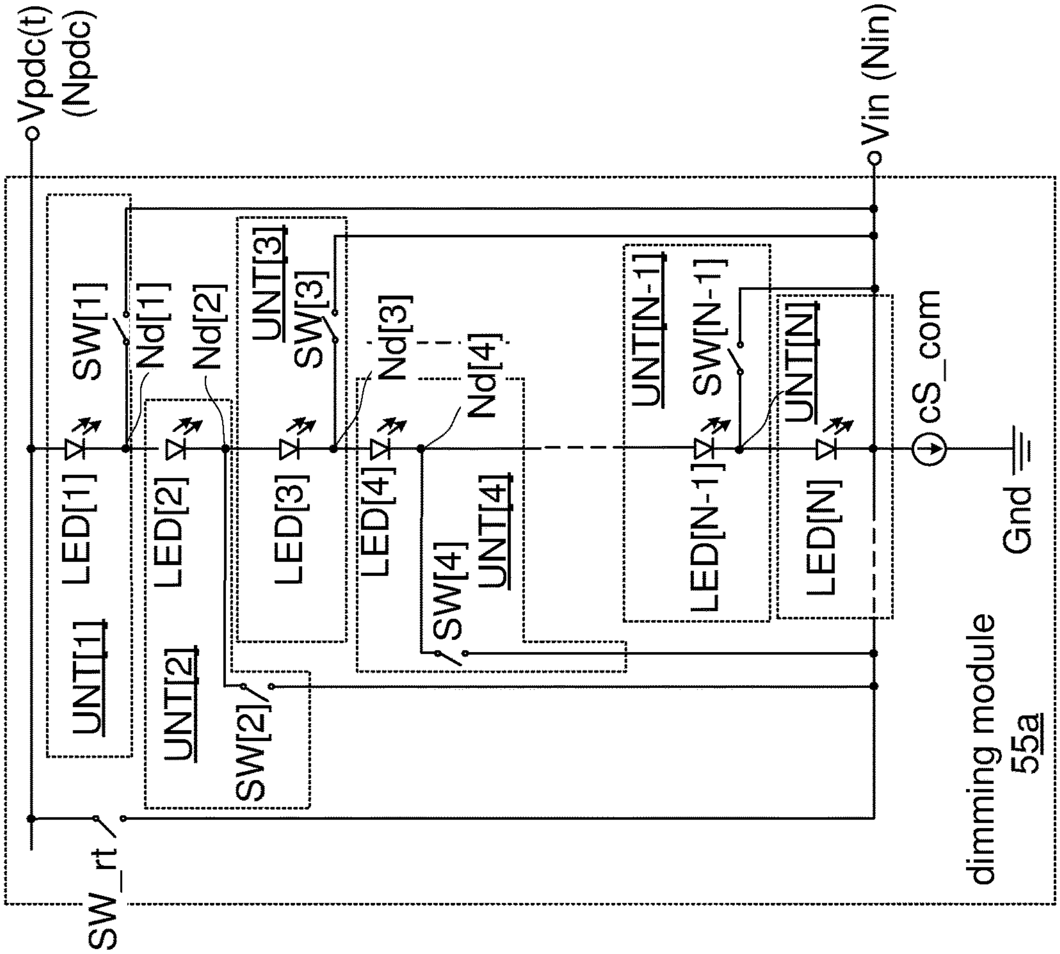
FIG. 11 is a schematic diagram of a dimming module according to a third embodiment of the disclosure.

Please refer to FIG. 11, which is a schematic diagram of a dimming module according to a third embodiment of the disclosure. The dimming module 55*a* includes: a bypass switch SW_rt, dimming units UNT[1]~UNT[N], and a common current source cS_com. The bypass switch SW_rt is electrically connected between the pulsed DC terminal Npdc and the input terminal Nin. Furthermore, the common current source cS_com is electrically connected between the input terminal Nin and the ground voltage Gnd.

The dimming unit UNT[n] (n=1-(N−1)) includes a switch unit SW[n] and a light-emitting diode unit LED[n]; the switch unit SW[n] is electrically connected to the control circuit, the light-emitting diode unit LED[n], the dimming unit UNT[n+1] and the LDO; and the dimming unit UNT[N] only includes the light-emitting diode unit LED[N]. In the case of n=1, two terminals of the light-emitting diode unit LED[1] are electrically connected to the pulsed DC terminal Npdc and the voltage-dividing terminal Nd[1], respectively. In cases of n=2-(N−1), two terminals of the light-emitting diode unit LED[n] are electrically connected to the voltage-dividing terminals Nd[n-1] and Nd[n], respectively. In the case of n=N, two terminals of the light-emitting diode unit LED[N] are electrically connected to the voltage-dividing terminal Nd[N−1] and the input terminal Nin, respectively.

While the switch unit SW[n] of the dimming unit UNT[n] is switched on, the switch units SW[1]~SW[n-1] and SW[n+1]~SW[N−1] are switched off. Therefore, the serially-connected light-emitting diode units LED[1]~LED[n] of the dimming units UNT[1]~UNT[n] are all in the light-on state, and the light-emitting diode units LED[n+1]~LED[N] of the dimming units UNT[n+1]~UNT[N] are all in the light-off state.

In the embodiment, each light-emitting diode unit LED[n] includes a single light-emitting diode LED. However, in real applications, the number of light-emitting diodes included in each light-emitting diode unit LED[n] is not limited.

Figures 12A, 12B, 12C, 12D:
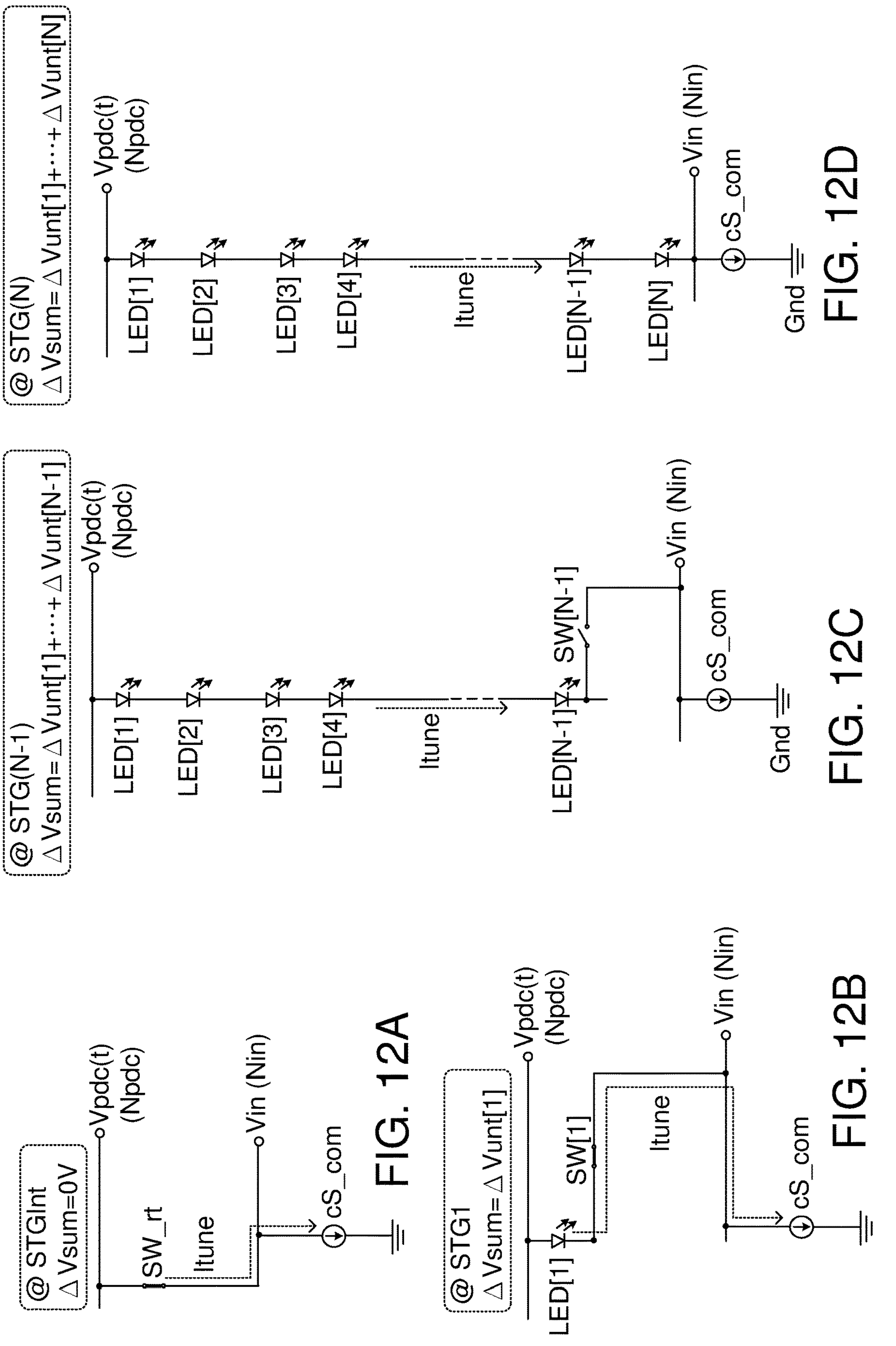
FIGS. 12A, 12B, 12C, and 12D are equivalent circuit diagrams of the dimming module at the initial stage STGint and the dimming stages STG1, STG(N-1), STGN, respectively, according to the third embodiment of the disclosure.

Please refer to FIG. 12A, which is an equivalent circuit diagram of the dimming module 55*a* of FIG. 11 at the initial stage STGint. At the initial stage STGint, the bypass switch SW_rt is switched on, and the switch units SW[1]~SW[N−1] are all switched off. At this time, the dimming current Itune directly flows from the pulsed DC terminal Npdc to the input terminal Nin. Therefore, in FIG. 12A, the module voltage drop ΔVsum is 0V, and the input voltage Vin is equal to the pulsed DC voltage Vpdc(t), and is also equal to the voltage drop $\Delta V_{cS\_com}$ across the common current source cS_com, that is, $Vin=Vpdc(t)=\Delta V_{cS\_com}$.

Please refer to 12B, which is an equivalent circuit diagram of the dimming module 55*a* of FIG. 11 at the dimming stage STG1. At the dimming stage STG1, only the switch unit SW[1] is switched on, and the bypass switch SW_rt and the switch units SW[2]~SW[N−1] are all switched off. Hence, only the light-emitting diode unit LED[1] emits light. At this time, the dimming current Itune flows from the pulsed DC terminal Npdc to the input terminal Nin through the light-emitting diode unit LED[1]. Therefore, in FIG. 12B, the module voltage drop ΔVsum is equal to the unit voltage drop ΔVunt[1], that is, $\Delta Vsum=\Delta Vunt[1]=\Delta V_{LED[1]}$. Further, the input voltage Vin is equal to the voltage difference between the pulsed DC voltage Vpdc(t) and the module voltage drop ΔVsum, and is also equal to the voltage drop $\Delta V_{cS\_com}$ across the common current source cS_com, that is, $Vin=Vpdc(t)-\Delta Vsum=Vpdc(t)-\Delta Vunt[1]=\Delta V_{cS\_com}$.

Please refer to FIG. 12C, which is an equivalent circuit diagram of the dimming module 55*a* of FIG. 11 at the dimming stage STG(N−1). At the dimming stage STG(N−1), only the switch unit SW[N−1] is switched on, and the bypass switch SW_rt and the switch units SW[1]~SW[N−2] are all switched off. Hence, the serially-connected light-emitting diode units LED[1]~LED[N−1] emit light. At this time, the dimming current Itune flows from the pulsed DC terminal Npdc to the input terminal Nin through the light-emitting diode units LED[1]~LED[N−1]. Therefore, in FIG. 12C, the module voltage drop ΔVsum is equal to the sum of the unit voltage drops ΔVunt[1]-ΔVunt[N−1], that is, $\Delta Vsum=\Sigma_{n=1}^{N-1}\Delta Vunt[n]=\Sigma_{n=1}^{N-1}\Delta V_{LED[n]}$. Further, the input voltage Vin is equal to the voltage difference between the pulsed DC voltage Vpdc(t) and the module voltage drop ΔVsum, and is also equal to the voltage drop $\Delta V_{cS\_com}$ across the common current source cS_com, that is, $Vin=Vpdc(t)-\Delta Vsum=Vpdc(t)-\Sigma_{n=1}^{N-1}\Delta Vunt[n]=\Delta V_{cS\_com}$.

Please refer to FIG. 12D, which is an equivalent circuit diagram of the dimming module 55*a* of FIG. 11 at the dimming stage STGN. At the dimming stage STGN, the bypass switch SW_rt and the switch units SW[1]~SW[N−1] are all switched off. Hence, the serially-connected light-emitting diode units LED[1]~LED[N] emit light. At this time, the dimming current Itune flows from the pulsed DC terminal Npdc to the input terminal Nin through the light-emitting diode units LED[1]~LED[N]. Therefore, in FIG.

12D, the module voltage drop ΔVsum is equal to the sum of the unit voltage drops ΔVunt[1]-ΔVunt[N], that is, $\Delta Vsum=\Sigma_{n=1}^{N}\Delta Vunt[n]=\Sigma_{n=1}^{N}\Delta V_{LED[n]}$. Further, the input voltage Vin is equal to the voltage difference between the pulsed DC voltage Vpdc(t) and the module voltage drop ΔVsum, and is also equal to the voltage drop $\Delta V_{cS\_com}$ across the common current source cS_com, that is, $Vin=Vpdc(t)-\Delta Vsum=Vpdc(t)-\Sigma_{n=1}^{N}\Delta Vunt[n]=\Delta V_{cS\_com}$.

Figure 13:
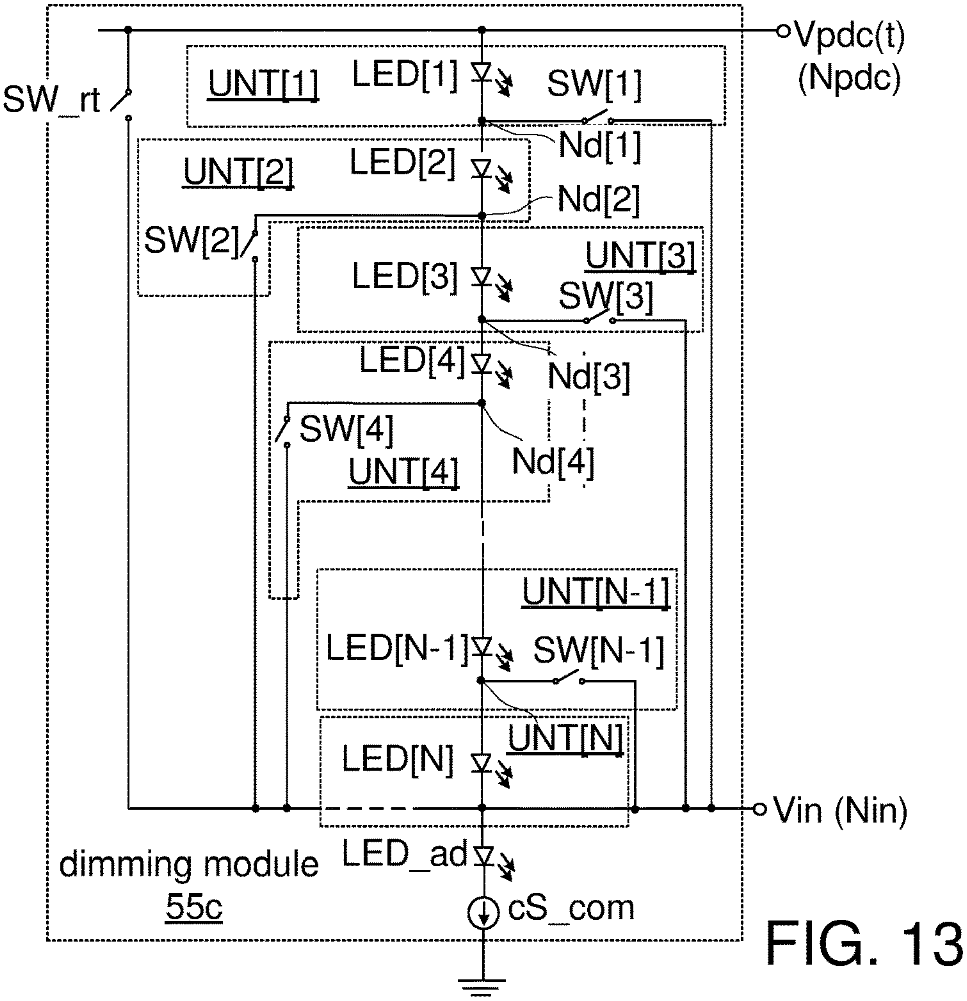
FIG. 13 is a schematic diagram of a dimming module modified from the third embodiment of the disclosure.

Please refer to FIG. 13, which is a schematic diagram of a dimming module modified from the third embodiment of the disclosure. Please refer to both FIGS. 11 and 13. Comparing the dimming modules **55*a* and 55*c*, it is shown that, in addition to the dimming units UNT[1]~UNT[N] and the common current source cS_com, an auxiliary light-emitting diode LED_ad is inserted between the dimming unit UNT [N] and the common current source cS_com of the dimming module 55*c***.

Adopting the architecture of FIG. 13, regardless of the dimming stage STGn of the dimming module **55*c*, the auxiliary light-emitting diode LED_ad keeps in the light-on state. Therefore, the input voltage Vin is equal to the sum of the voltage drop $\Delta V_{cS\_com}$ across the common current source cS_com and the voltage drop $\Delta V_{LED\_ad}$ across the auxiliary light-emitting diode LED_ad, that is, $Vin=\Delta V_{cS\_com}+\Delta V_{LED\_ad}$. Since the dimming modules 55*a* and 55*c* have similar architecture, the operation of the dimming module 55*c*** is not repeated herein.

Three types of dimming modules **35*a*, 35*c*, 45*a*, 45*c*, 55*a*, and 55*c*** are provided in the above embodiments. Further, the above description has indicated that the detailed circuit and control method of these embodiments could be modified. For comparison purposes, Table 2 shows the comparison of the circuit components of the embodiments. It is realized that the design of the dimming module of the disclosure is very diverse.

TABLE 2

| Dimming module (FIG.) | | Dimming unit UNT[n] | Shared component: Common current source cS_com | Shared component: Auxiliary light-emitting diode LED_ad | Shared component: Bypass switch SW_rt |
|---|---|---|---|---|---|
| 1st embodiment | 35a (FIG. 2) 35c (FIG. 5) | n = 1~N including: LED[n] (for example, LED_na, LED_nb), SW[n] (for example, SW_na, SW_nb) and cS[n] | None | None | None |
| 2nd embodiment | 45a (FIG. 7) | n = 1~N including: LED[n] and SW[n] connected in parallel | Yes | None | None |
| | 45c (FIG. 10) | | | Yes | |
| 3rd embodiment | 55a (FIG. 11) | n = 1~(N − 1) including: LED[n] and SW[n] | Yes | None | Yes |
| | 55a (FIG. 13) | n = N including: only LED[n] | | Yes | |

The dimming module in any of the above embodiments can provide the LDO with a stable input voltage Vin approximate to the regulated voltage Vldo. Table 3 collects the input voltage Vin provided by the dimming module in the above embodiments.

TABLE 3

| Dimming module | | Input voltage Vin |
|---|---|---|
| 1st embodiment | FIG. 2 | $Vin = Vpdc(t) - \Delta Vsum = \Delta V_{cS[n]}$ |
| | FIG. 5 | $Vin = Vpdc(t) - \Delta Vsum = \Delta V_{LED\_nb} + \Delta V_{cS[n]}$ |
| 2nd embodiment | FIG. 7 | $Vin = Vpdc(t) - \Delta Vsum = \Delta V_{cS\_com}$ |
| | FIG. 10 | $Vin = Vpdc(t) - \Delta Vsum = \Delta V_{LED\_ad} + \Delta V_{cS\_com}$ |
| 3rd embodiment | FIG. 11 | $Vin = Vpdc(t) - \Delta Vsum = \Delta V_{cS\_com}$ |
| | FIG. 13 | $Vin = Vpdc(t) - \Delta Vsum = \Delta V_{LED\_ad} + \Delta_{VcS\_com}$ |

Table 3 is concluded that the input voltage Vin could be viewed as the sum of a voltage drop $\Delta V_{cS}$ across a current source and a base voltage Vbs according to the disclosure, that is, $Vin=\Delta V_{cS}+Vbs$. In different embodiments, the current source may be the branch current source cS[n] or the common current source cS_com. Also, in different embodiments, the base voltage Vbs is equal to 0V, the voltage drop $\Delta V_{LED\_nb}$ across the light-emitting diode LED_nb, or the voltage drop $\Delta V_{LED\_ad}$ across the auxiliary light-emitting diode LED_ad.

As described above, adopting the concepts of the disclosure, the linear driving module provides the LDO with the input voltage Vin whose voltage value approximates the regulated voltage Vldo. Higher pulsed DC voltage Vpdc(t) brings about more light-emitting diode units in the light-on state and higher module voltage drop ΔVsum. Conversely, lower pulsed DC voltage Vpdc(t) brings about fewer light-emitting diode units in the light-on state and lower module voltage drop ΔVsum. The method of generating the input voltage Vin according to the voltage difference between the pulsed DC voltage Vpdc(t) and the module voltage drop ΔVsum amounts to using the remainder of the pulsed DC voltage Vpdc(t), after powering the loading, as the input voltage Vin. Therefore, the voltage difference between the input and the output of the LDO is considerably lowered, and the power consumption on the LDO is reduced.

Except for receiving the input voltage Vin from the dimming module, the linear driving module may include a bias circuit serving as a source of the input voltage Vin. Please refer to FIG. 14, which is a block diagram showing that a bias circuit is used to provide the input voltage Vin according to the disclosure. The linear driving module 62 includes: a dimming module 65, a control circuit 67, a bias circuit 66, and a LDO 68. In this embodiment, the dimming module 65 is not electrically connected to the LDO 68. As described above, the linear driving module 62 receives the pulsed DC voltage Vpdc(t), which may be the rectified voltage Vbg from the bridge rectifier 23 or the valley-fill voltage Vvf from the valley-fill circuit 24. The details about the dimming module 65, the control circuit 67, and the LDO 68 are not described again herein.

The bias circuit 66 is electrically connected to the pulsed DC terminal Npdc through a terminal Np, electrically connected to the LDO 68 through a bias terminal Nb3, and electrically connected to the ground voltage Gnd through a terminal Nn. Applying to the previous embodiment, the terminal Np connected to the pulsed DC terminal Npdc may receive the rectified voltage Vbg output by the bridge rectifier 23 as the pulsed DC voltage Vpdc(t), or receive the valley-fill voltage Vvf output by the valley-fill circuit 24 as the pulsed DC voltage Vpdc(t).

The bias circuit 66 receives the pulsed DC voltage Vpdc (t), and then converts the pulsed DC voltage Vpdc(t) into the input voltage Vin. The bias circuit 66 includes a capacitor C, resistors R1, R2, R3, R4, transistors Q1, Q2, a diode D and Zener diodes Zd1, Zd2, Zd3.

One terminal of the resistors R1, R3, and the anode of the diode D are electrically connected to the pulsed DC terminal Npdc. The cathode of the diode D is electrically connected to a terminal of the resistor R4. The cathode of the Zener diode Zd1 is electrically connected to the other terminal of the resistor R1. The anode of the Zener diode Zd1, one terminal of the resistor R2, the cathode of the Zener diode Zd2, and the gate of the transistor Q1 are all electrically connected to a bias terminal Nb1. The drain of the transistor Q1, the other terminal of the resistor R3, the cathode of the Zener diode Zd3, and the gate of the transistor Q2 are all electrically connected to a bias terminal Nb2. The drain of the transistor Q2 is electrically connected to the other terminal of the resistor R4. The other terminal of the resistor R2, the anodes of the Zener diodes Zd2, Zd3, the source of the transistor Q1, and one terminal of the capacitor C are electrically connected to the ground voltage Gnd. The source of the transistor Q2 and the other terminal of the capacitor C are electrically connected to the bias terminal Nb3.

It is to be noted that, in real applications, the positions of the resistor R1 and the Zener diode Zd1 connected in series are interchangeable, and the positions of the diode D and the resistor R4 connected in series are also interchangeable. In other words, the resistor R1 could be electrically connected to the bias terminal Nb1 and the anode of the Zener diode Zd1, and the cathode of the Zener diode Zd1 could be electrically connected to the pulsed DC terminal Npdc. Furthermore, the resistor R4 could be electrically connected to the pulsed DC terminal Npdc and the anode of the diode D, and the cathode of the diode D could be electrically connected to the drain of the transistor Q2.

When the pulsed DC voltage Vpdc(t) rises and falls cyclically, the bias circuit 66 provides the input voltage Vin at two bias stages STGb1 and STGb2. In the embodiment, the breakdown voltage of the Zener diode Zd1 could be considered as a threshold voltage Vth. The bias circuit 66 is determined to be at the bias stage STGb1 or STGb2 according to the relation between the pulsed DC voltage Vpdc(t) and the threshold voltage Vth. If the pulsed DC voltage Vpdc(t) is lower than the threshold voltage Vth, the bias circuit 66 is at the bias stage STGb1; and if the pulsed DC voltage Vpdc(t) is higher than the threshold voltage Vth, the bias circuit 66 is at the bias stage STGb2.

Taking the breakdown voltage=the threshold voltage Vth=15V as an example, if the pulsed DC voltage Vpdc(t) is lower than the breakdown voltage of the Zener diode Zd1, the pulsed DC voltage Vpdc(t)<15V so that the voltage conducted to the cathode of the Zener diode Zd1 through the resistor R1 is insufficient to make the Zener diode Zd1 conduct. Therefore, the transistor Q1 is not switched on because the voltage is 0V at the bias terminal Nb1. On the other hand, the voltage conducted to the bias terminal Nb2 through the resistor R3 is at a high level so as to switch on the transistor Q2. Consequently, the turned-on transistor Q2 transmits the pulsed DC voltage Vpdc(t) to the bias terminal Nb3 to charge the capacitor C.

If the pulsed DC voltage Vpdc(t) is higher than the breakdown voltage of the Zener diode Zd1, the pulsed DC voltage Vpdc(t)>15V, and the Zener diode Zd1 conducts so that the voltage at the bias terminal Nb1 rises. Hence, the transistor Q1 is switched on due to the rising voltage at the bias terminal Nb1, and the voltage at the bias terminal Nb2 falls to the ground voltage 0V due to the turned-on transistor Q1. The transistor Q2 will be switched off due to the lowered voltage at the bias terminal Nb2. At this time, the input voltage Vin formed between the bias terminal Nb3 and the ground voltage Gnd is provided by the discharge of the capacitor C, which has been fully-charged.

It is known from the above description that the transistor Q1 is switched off when the pulsed DC voltage Vpdc(t) is lower than the threshold voltage Vth, and the transistor Q1 is switched on when the pulsed DC voltage Vpdc(t) is higher than the threshold voltage Vth; and the transistor Q2 is switched on when the transistor Q1 is switched off, and the transistor Q2 is switched off when the transistor Q1 is switched on. The capacitor C is charged by the pulsed DC voltage Vpdc(t) conducted to the bias terminal Nb3 when the transistor Q2 is switched on, and the capacitor C is discharged and the current flows to the bias terminal Nb3 when the transistor Q1 is switched on.

At the bias stage STGb1, the voltage at the bias terminal Nb3 is the pulsed DC voltage Vpdc(t) transmitted through the diode D, the resistor R4, and the transistor Q2. At the bias stage STGb1, the pulsed DC voltage Vpdc(t) has a relatively low voltage value. Even though the pulsed DC voltage Vpdc(t) is conducted to the bias terminal Nb3, there is still a low dropout between the input voltage Vin and the regulated voltage Vldo. At the bias stage STGb2, although the voltage value of the pulsed DC voltage Vpdc(t) is high, it does not affect the input voltage Vin because it is disconnected to the bias terminal Nb3. At this time, the input voltage Vin is provided by the capacitor C to ensure that the input voltage Vin received by the LDO 68 is not too high.

Figure 14:
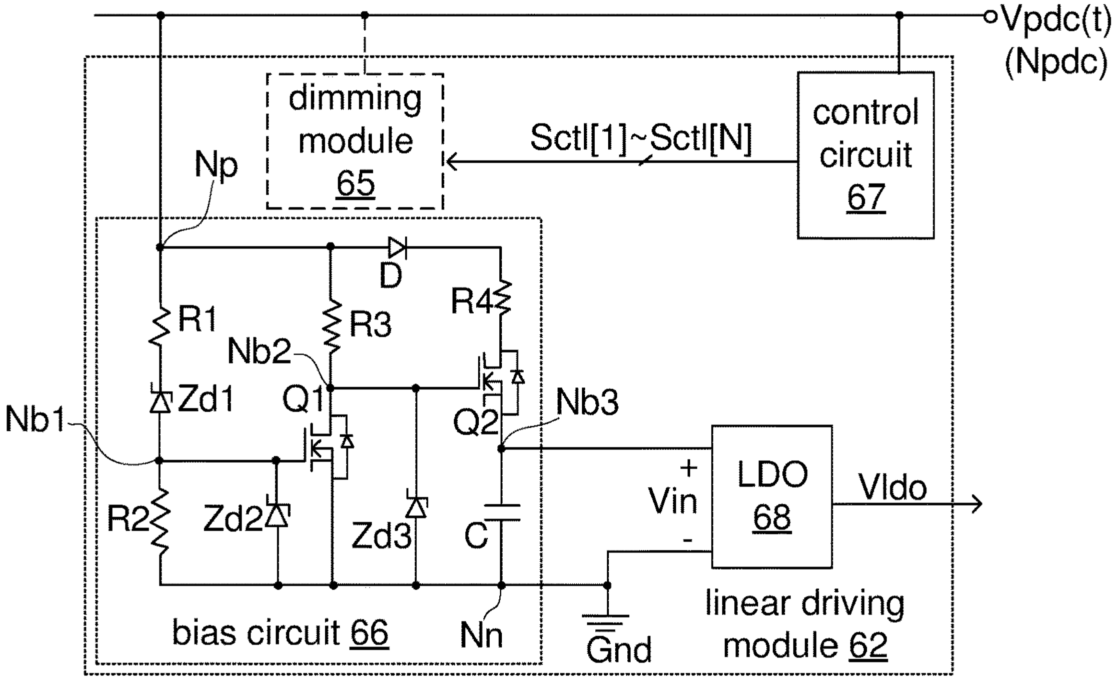
FIG. 14 is a block diagram showing that a bias circuit is used to provide the input voltage Vin according to the disclosure.

FIG. 14 illustrates that the bias circuit 66 provides the input voltage Vin. The bias circuit 66 directly receives the pulsed DC voltage Vpdc(t). Accordingly, even though no light-emitting diode in the dimming module 65 emits light, the bias circuit 66 can still provide stable input voltage Vin. Therefore, the concept of that the linear driving module 62 uses the bias circuit 66 to provide the LDO 68 with the input voltage Vin can be applied to other electronic apparatus including an LDO but no light-emitting diode. In real applications, the bias circuit 66 could cooperate with the dimming module 65 to serve as the source of the input voltage Vin. It is to be noted that the dimming module 65 could be any dimming module described in or modified from the above embodiments, and is not limited to this embodiment.

Figure 15A:
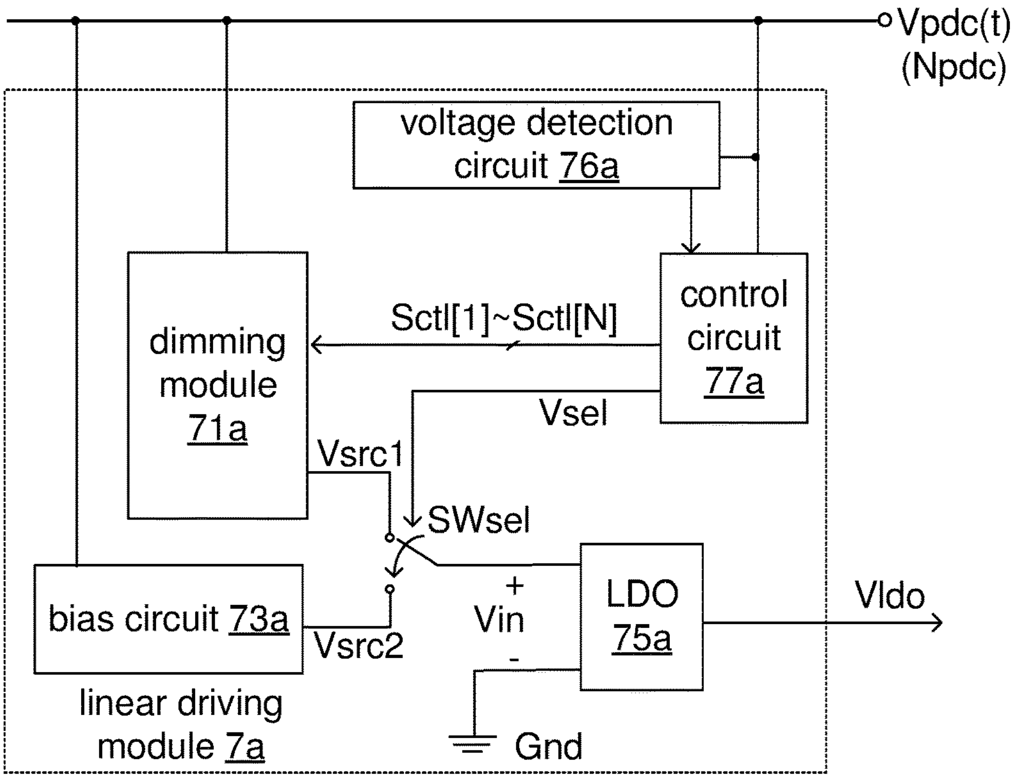
FIGS. 15A and 15B are block diagrams showing that the linear driving modules include both the dimming module and the bias circuit serving as the sources of the input voltage Vin according to the disclosure.
Figure 15B:
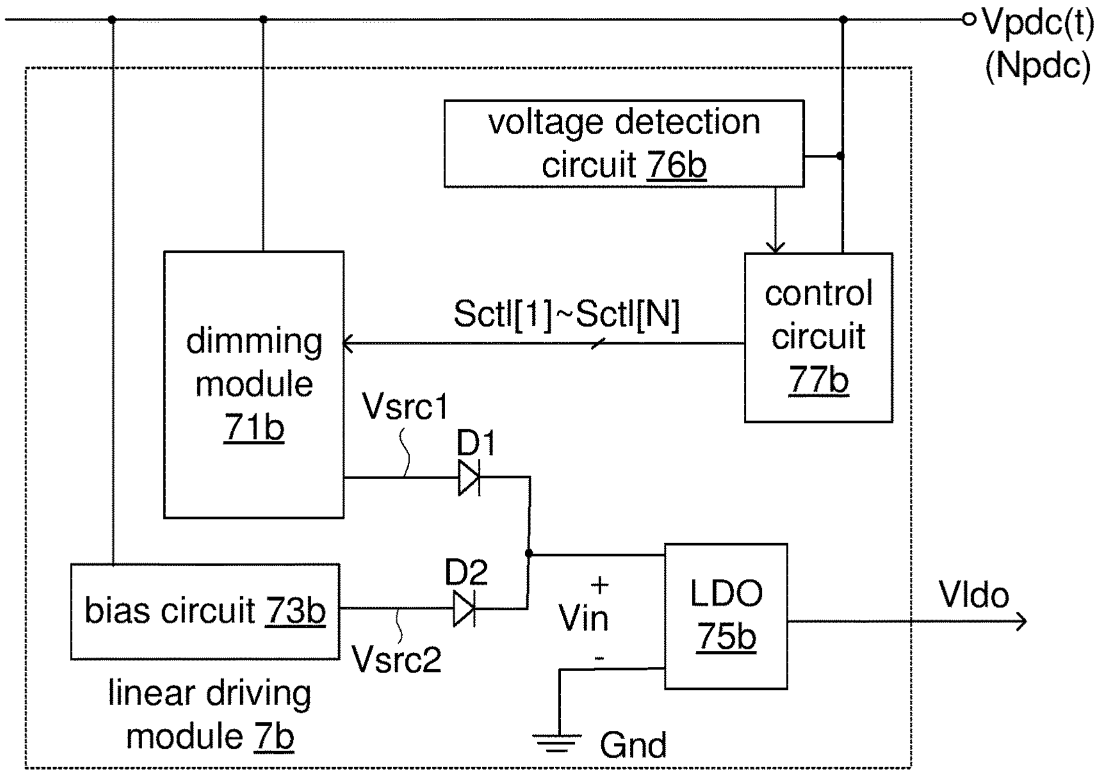

Please refer to FIGS. 15A and 15B, which are block diagrams showing that the linear driving module includes both the dimming module and the bias circuit serving as the sources of the input voltage Vin according to the disclosure. As described above, the dimming module 65 could generate a first source voltage according the pulsed DC voltage Vpdc(t) and the module voltage drop ΔVsum. The bias circuit 66 is electrically connected to the control circuit 67, and generates a second source voltage according to the pulsed DC voltage Vpdc(t). In FIGS. 15A and 15B, the linear driving module 7*a*, 7*b* includes a dimming module 71*a*, 71*b* and a bias circuit 73*a*, 73*b*. Further, the linear driving module 7*a*, 7*b* uses the corresponding dimming module 71*a*, 71 *b* to provide the source voltage Vsrc1 and uses the corresponding bias circuit 73*a*, 73*b* to provide the source voltage Vsrc2. The low-dropout regulator 75*a*, 75*b* selects one of the first source voltage (that is, the source voltage Vsrc1) and the second source voltage (that is, the source voltage Vsrc2) as the input voltage Vin according to the change of the module voltage drop ΔVsum, and converts the input voltage Vin into the regulated voltage Vldo. Both the first source voltage and the second source voltage are lower than or equal to the pulsed DC voltage Vpdc(t), and the regulated voltage Vldo is lower than the input voltage Vin. It is to be noted that the linear driving modules 7*a* and 7*b* could adopt different methods to switch among the source voltages Vsrc1 and Vsrc2.

In FIG. 15A, the linear driving module 7*a* includes: the dimming module 71*a*, the voltage detection circuit 76*a*, the control circuit 77*a*, the bias circuit 73*a*, the LDO 75*a* and a selection switch SWsel. The selection switch SWsel is a single pole double throw (SPDT) switch electrically connected to the LDO 75*a* and the control circuit 77*a*, and is selectively electrically connected to the dimming module 71*a* or the bias circuit 73*a*. The selection switch SWsel selectively electrically connects the LDO 75*a* to either the dimming module 71*a* or the bias circuit 73*a* according to a source selection signal Vsel sent from the control circuit 77*a*. The control circuit 77*a* decides how the source selection signal Vsel controls the selection switch SWsel according to the switch signals Sctl[1]~Sctl[N].

When the switch signals Sctl[1]~Sctl[N] represent that there is any dimming unit UNT[1]~UNT[N] in the light-on state, the module voltage drop ΔVsum is higher than 0V, and the control circuit 77*a* uses the source selection signal Vsel to control the selection switch SWsel to electrically connect the LDO 75*a* to the dimming module 71*a* and conduct the source voltage Vsrc1 to the LDO 75*a*. At this time, the LDO 75*a* receives the source voltage Vsrc1 provided by the dimming module 71*a* as the input voltage Vin. On the other hand, when the switch signals Sctl[1]~Sctl[N] represent that the dimming units UNT[1]~UNT[N] are all in the light-off state, the module voltage drop ΔVsum is equal to 0V, and the control circuit 77*a* uses the source selection signal Vsel to control the selection switch SWsel to electrically connect the LDO 75*a* to the bias circuit 73*a* and conduct the source voltage Vsrc2 to the LDO 75*a*. At this time, the LDO 75*a* receives the source voltage Vsrc2 provided by the bias circuit 73*a* as the input voltage Vin. The bias circuit 73*a* is provided to ensure that the LDO 75*a* can receive the source voltage Vsrc2 as the input voltage Vin stably even though the dimming units UNT[1]~UNT[N] are all in the light-off state.

In FIG. 15B, the linear driving module 7*b* includes: the dimming module 71*b*, the voltage detection circuit 76*b*, the control circuit 77*b*, the bias circuit 73*b*, the LDO 75*b*, and diodes D1, D2. When the switch signals Sctl[1]~Sctl[N] represent that there is any dimming unit UNT[1]~UNT[N] in the light-on state, the module voltage drop ΔVsum is higher than 0V. The source voltage Vsrc1 has a higher voltage, and the diode D1 conducts the source voltage Vsrc1 to the LDO 75*b* to provide the input voltage Vin required by the LDO 75*b*. On the other hand, when the switch signals Sctl[1]~Sctl[N] represent that the dimming units UNT[1]~UNT[N] are all in the light-off state, the module voltage drop ΔVsum is equal to 0V. The source voltage Vsrc1 is equal to 0V. The source voltage Vsrc2 serves as the source of the input voltage Vin instead, and the source voltage Vsrc2 is conducted to the LDO 75*b*.

According to the above description, by adopting the architecture of FIG. 15A or 15B, regardless of the number of the dimming units UNT[1]~UNT[N] in the light-on state, even no dimming unit UNT[1]~UNT[N] in the light-on state, the LDOs 75*a*, 75*b* can receive the required input voltage Vin stably. In real applications, if the linear driving module includes both the dimming module and the bias circuit, the switching could be performed in other manners and is not limited to the examples given in FIGS. 15A and 15B.

According to the concepts of the disclosure, the source of the input voltage Vin could be the dimming module or the bias circuit alone. Alternatively, the source selection signal Vsel is used to select the source of the input voltage Vin when the dimming module and the bias circuit are included. Consequently, no matter whether the input voltage Vin is provided by the dimming module or the bias circuit, a relatively low voltage difference is remained between the input voltage Vin and the regulated voltage Vldo. Therefore, the disclosure can significantly reduce the power wasted by the LDO.

According to the concepts of the disclosure, the input voltage provided by the linear driving module to the low-dropout regulator does not vary with the pulsed DC voltage. When the pulsed DC voltage is changed, the dimming state of the dimming module of the linear driving module is also changed, thereby changing the module voltage drop. Because the module voltage drop varies with the pulsed DC voltage, the input voltage is kept stable. This operation can reduce the voltage difference between the input voltage and the regulated voltage output by the low-dropout regulator so as to reduce the power wasted by the low-dropout regulator.

In conclusion, although the disclosure has been described with the embodiments, they are not provided to limit the disclosure. A person having ordinary skill in the art related to the disclosure can make various modifications and variations without deviating from the spirit and scope of the disclosure. Hence, the scope of the disclosure is indicated by the following claims.

What is claimed is:

1. A linear driving module adapted to be used in a lamp, comprising:

a control circuit, for generating a plurality of switch signals in response to a change of a pulsed DC voltage;

a dimming module, having a module voltage drop and receiving the pulsed DC voltage, the dimming module comprising:

N dimming units connected in series, wherein each of the N dimming units comprises: a light-emitting diode unit being in a light-on state or a light-off state in response to the switch signals, wherein the module voltage drop varies with a number of the light-emitting diode units in the light-on state in the N dimming units; and a low-dropout regulator, electrically connected to the dimming module, for receiving an input voltage generated by the dimming module according to the pulsed DC voltage and the module voltage drop and converting the input voltage into a regulated voltage, wherein the input voltage is lower than the pulsed DC voltage, the regulated voltage is lower than the input voltage, and N is a positive integer.

2. The linear driving module according to claim 1, wherein a voltage value of the pulsed DC voltage varies with time, and when the voltage value of the pulsed DC voltage is higher, the module voltage drop is higher.

3. The linear driving module according to claim 1, wherein an nth dimming unit among the N dimming units further comprises:

a switch unit, comprising:

a first switch, electrically connected to the control circuit and the light-emitting diode unit of the nth dimming unit;

a second switch, electrically connected to the control circuit and the light-emitting diode unit of the nth dimming unit, wherein the first switch and the second switch are controlled to be switched on or switched off synchronously in response to an nth switch signal among the switch signals; and a branch current source, electrically connected to the second switch, wherein n is a positive integer and n is smaller than or equal to N.

4. The linear driving module according to claim 3, wherein when the first switch and the second switch of the nth dimming unit are switched on, the light-emitting diode units of a first dimming unit to the nth dimming unit among the N dimming units are all in the light-on state, and the light-emitting diode units of an (n+1)th dimming unit to an Nth dimming unit among the N dimming units are all in the light-off state.

5. The linear driving module according to claim 4, wherein the module voltage drop is a sum of unit voltage drops of the light-emitting diode units in the light-on state.

6. The linear driving module according to claim 3, wherein the first switch is electrically connected to the second switch.

7. The linear driving module according to claim 3, wherein the light-emitting diode unit of the nth dimming unit comprises:

a first light-emitting diode, electrically connected to the first switch; and a second light-emitting diode, electrically connected to the first switch, the second switch and the first light-emitting diode.

8. The linear driving module according to claim 1, wherein the dimming module further comprises:

a common current source, electrically connected to the control circuit and an Nth dimming unit among the N dimming units, wherein a current value of the common current source is set by the control circuit.

9. The linear driving module according to claim 1, wherein the dimming module further comprises:

an auxiliary light-emitting diode, electrically connected to an Nth dimming unit among of the N dimming units; and a common current source, electrically connected to the control circuit and the auxiliary light-emitting diode, wherein a current value of the common current source is set by the control circuit.

10. The linear driving module according to claim 1, wherein an nth dimming unit among the N dimming units further comprises:

a switch unit, electrically connected to the control circuit and being in parallel connection with the light-emitting diode unit of the nth dimming unit, the switch unit being selectively switched on or switched off in response to an nth switch signal among the switch signals, wherein n is a positive integer, and n is smaller than or equal to N.

11. The linear driving module according to claim 10, wherein, when the switch unit of the nth dimming unit is controlled to be switched on in response to the nth switch signal, the light emitting diode unit of the nth dimming unit is in the light-off state; and when the switch unit is controlled to be switched off in response to the nth switch signal, the light-emitting diode unit of the nth dimming unit is in the light-on state.

12. The linear driving module according to claim 10, wherein, when the switch units of a first to the nth dimming units among the N dimming units are all switched off, the switch units of an (n+1)th to an Nth dimming units among the N dimming units are all switched on.

13. The linear driving module according to claim 10, wherein, when the switch units of a first to an (N−n) th dimming units among the N dimming units are all switched on, the switch units of an (N−n+1) th to an Nth dimming units among the N dimming units are all switched off.

14. The linear driving module according to claim 1, wherein an nth dimming unit among the N dimming units further comprises:

a switch unit, electrically connected to the control circuit, the light-emitting diode unit of the nth dimming unit, an (n+1) th dimming unit among the N dimming units and the low-dropout regulator, wherein n is a positive integer and n is smaller than N.

15. The linear driving module according to claim 14, wherein when the switch unit of the nth dimming unit is switched on, the light-emitting diode units of a first to the nth dimming units among the N dimming units are all in the light-on state, and the light-emitting diode units of an (n+1) th to an Nth dimming units among the N dimming units are all in the light-off state.

16. A linear driving module adapted to be used in a lamp, comprising:

a control circuit, adapted to receive a pulsed DC voltage and generate a plurality of switch signals in response to a change of the pulsed DC voltage;

a dimming module, electrically connected to the control circuit, for generating a first source voltage according to the pulsed DC voltage and a module voltage drop, the dimming module comprising:

N dimming units connected in series, wherein each of the N dimming units comprises: a light-emitting diode unit being in a light-on state or a light-off state in response to the switch signals, wherein N is a positive integer, and the module voltage drop varies with a number of the light-emitting diode units in the light-on state in the N dimming units;

a bias circuit, electrically connected to the control circuit, for generating a second source voltage according to the pulsed DC voltage; and a low-dropout regulator, for receiving either the first source voltage or the second source voltage as an input voltage in response to the change of the module voltage drop, and converting the input voltage into a regulated voltage, wherein the first source voltage and the second source voltage are lower than or equal to the pulsed DC voltage, and the regulated voltage is lower than the input voltage.

17. The linear driving module according to claim 16, wherein when any of the light-emitting diode units in the N dimming units is in the light-on state, the control circuit selects and conducts the first source voltage to the low-dropout regulator; and when the light-emitting diode units in the N dimming units are all in the light-off state, the control circuit selects and conducts the second source voltage to the low-dropout regulator.

18. The linear driving module according to claim 16, wherein the bias circuit comprises:

a first transistor, being switched off when the pulsed DC voltage is lower than a threshold voltage, and being switched on when the pulsed DC voltage is higher than the threshold voltage;

a second transistor, electrically connected to the first transistor and a bias terminal, the second transistor being switched on when the first transistor is switched off, and being switched off when the first transistor is switched on; and a capacitor, electrically connected to the bias terminal, the capacitor being discharged to provide a current to the bias terminal, and being charged by the pulsed DC voltage when the second transistor is switched on.

19. A linear driving module, comprising:

a bias circuit, for generating an input voltage according to a pulsed DC voltage, the bias circuit comprising:

a first transistor, being switched off when the pulsed DC voltage is lower than a threshold voltage, and being switched on when the pulsed DC voltage is higher than the threshold voltage;

a second transistor, electrically connected to the first transistor and a bias terminal, the second transistor being switched on when the first transistor is switched off, and being switched off when the first transistor is switched on; and a capacitor, electrically connected to the bias terminal, the capacitor being charged by the pulsed DC voltage when the second transistor is switched on, and being discharged to provide a current to the bias terminal when the first transistor is switched on; and a low-dropout regulator, electrically connected to the bias terminal, for receiving the pulsed DC voltage transmitted to the bias terminal as the input voltage and converting the input voltage into a regulated voltage when the second transistor is switched on; and receiving a discharged current from the capacitor as the input voltage and converting the input voltage into the regulated voltage when the first transistor is switched on, wherein the regulated voltage is lower than the input voltage.

20. A bias circuit, for generating an input voltage according to a pulsed DC voltage, the bias circuit comprising:

a first transistor, being switched off when the pulsed DC voltage is lower than a threshold voltage, and being switched on when the pulsed DC voltage is higher than the threshold voltage;

a second transistor, electrically connected to the first transistor and a bias terminal, the second transistor being switched on when the first transistor is switched off, and being switched off when the first transistor is switched on; and a capacitor, electrically connected to the bias terminal, the capacitor being charged by the pulsed DC voltage when the second transistor is switched on, and being discharged to provide a current to the bias terminal when the first transistor is switched on.

* * * * *